(12) United States Patent
Katz

(10) Patent No.: US 7,246,093 B1
(45) Date of Patent: Jul. 17, 2007

(54) AUTOMATED EXCHANGE FOR TRADING DERIVATIVE SECURITIES

(75) Inventor: Gary Katz, Plainview, NY (US)

(73) Assignee: International Sercurities Exchange, LLC, New York, NY (US)

( * ) Notice: Subject to any disclaimer, the term of this patent is extended or adjusted under 35 U.S.C. 154(b) by 219 days.

(21) Appl. No.: 10/418,908

(22) Filed: Apr. 18, 2003

Related U.S. Application Data

(63) Continuation of application No. 09/433,613, filed on Nov. 2, 1999, now Pat. No. 6,618,707.

(60) Provisional application No. 60/106,935, filed on Nov. 3, 1998.

(51) Int. Cl.
*G06Q 40/00* (2006.01)
*G06F 17/16* (2006.01)

(52) U.S. Cl. ............................. 705/37; 705/35; 705/36

(58) Field of Classification Search ................. 705/37, 705/35, 36 R, 36 T
See application file for complete search history.

(56) References Cited

U.S. PATENT DOCUMENTS

| | | | |
|---|---|---|---|
| 3,573,747 A | 4/1971 | Adams et al. ........... 340/172.5 |
| 3,581,072 A | 5/1971 | Nymeyer ..................... 235/152 |
| 4,412,287 A | 10/1983 | Braddock, III .............. 364/408 |
| 4,674,044 A | 6/1987 | Kalmus et al. ............. 364/408 |
| 4,903,201 A | 2/1990 | Wagner ....................... 364/408 |
| 4,980,826 A | 12/1990 | Wagner ....................... 364/408 |
| 5,101,353 A | 3/1992 | Lupien et al. .............. 364/408 |
| 5,126,936 A | 6/1992 | Champion et al. |
| 5,136,501 A | 8/1992 | Silverman et al. .......... 364/408 |
| 5,297,032 A | 3/1994 | Trojan et al. ............... 364/408 |
| 5,305,200 A | 4/1994 | Hartheimer et al. ........ 364/408 |
| 5,664,115 A | 9/1997 | Fraser .......................... 705/37 |
| 5,689,652 A | 11/1997 | Lupien et al. .............. 395/237 |
| 5,715,402 A | 2/1998 | Popolo ......................... 705/37 |
| 5,787,402 A | 7/1998 | Potter et al. ................. 705/37 |
| 5,845,266 A | 12/1998 | Lupien et al. ............... 705/37 |
| 5,905,974 A | 5/1999 | Fraser et al. ................. 705/37 |

(Continued)

FOREIGN PATENT DOCUMENTS

EP 0411 748 5/1990

(Continued)

OTHER PUBLICATIONS

BBA -British Banker's Association—Revision of the IDS: Market Structure, Transparency and Liquidity; http://www.bba.org.uk/bba/jsp/polopoly.*

(Continued)

*Primary Examiner*—Yehdega Retta
(74) *Attorney, Agent, or Firm*—Frommer Lawrence & Haug LLP; Stephen J. Lieb

(57) ABSTRACT

An automated exchange is provided for trading the financial instruments, such as options contracts. The exchange receives an order to purchase or sell a quantity of the instrument. Information concerning the order is transmitted to one or more market participants. Responses to the transmitted information are received during a predetermined period of time. Trades are executed between the order and the responses. The information transmitted may include only limited information about the order. For example, the party placing the order may remain anonymous. The price of the trade is calculated based on the responses. The order may also trade against previously received orders and quotations.

9 Claims, 23 Drawing Sheets

U.S. PATENT DOCUMENTS

| | | | | |
|---|---|---|---|---|
| 5,913,202 | A | 6/1999 | Motoyama | 705/35 |
| 5,915,209 | A * | 6/1999 | Lawrence | 340/3.7 |
| 5,924,082 | A | 7/1999 | Silverman et al. | 705/37 |
| 5,946,666 | A | 8/1999 | Nevo et al. | 705/36 |
| 5,950,177 | A | 9/1999 | Lupien et al. | 705/37 |
| 5,970,479 | A | 10/1999 | Shepherd | 705/37 |
| 5,978,779 | A | 11/1999 | Stein et al. | 705/37 |
| 6,012,046 | A * | 1/2000 | Lupien et al. | 705/37 |
| 6,014,627 | A | 1/2000 | Togher et al. | 705/1 |
| 6,014,643 | A * | 1/2000 | Minton | 705/37 |
| 6,016,483 | A | 1/2000 | Rickard et al. | 705/37 |
| 6,035,288 | A | 3/2000 | Solomon | 705/37 |
| 6,076,068 | A | 6/2000 | DeLapa et al. | 705/14 |
| 6,112,189 | A | 8/2000 | Rickard et al. | 705/37 |
| 6,247,000 | B1 * | 6/2001 | Hawkins et al. | 705/37 |
| 6,317,727 | B1 | 11/2001 | May | 705/37 |
| 6,377,940 | B2 | 4/2002 | Tilfors et al. | 705/37 |
| 6,405,180 | B2 | 6/2002 | Tilfors et al. | 705/37 |
| 6,456,982 | B1 | 9/2002 | Pillipovic | 705/36 |
| 6,560,580 | B1 | 5/2003 | Fraser et al. | 705/37 |
| 6,671,818 | B1 | 12/2003 | Mikurak | 714/4 |
| 7,162,447 | B1 * | 1/2007 | Cushing | 705/37 |
| 7,162,448 | B2 * | 1/2007 | Madoff et al. | 705/37 |
| 2001/0044767 | A1 | 11/2001 | Madoff | 705/37 |
| 2002/0010673 | A1 | 1/2002 | Muller et al. | 705/37 |
| 2002/0133454 | A1 | 9/2002 | Malitzis et al. | 705/37 |
| 2003/0046218 | A1 | 3/2003 | Albanese et al. | 705/37 |

FOREIGN PATENT DOCUMENTS

| | | |
|---|---|---|
| EP | 1 528 497 A1 * | 5/2005 |
| WO | WO 93/15467 | 8/1993 |
| WO | WO 96/34357 | 4/1996 |
| WO | WO 97/03408 | 7/1996 |
| WO | WO 97/42591 | 11/1997 |
| WO | WO 98/38844 | 9/1998 |
| WO | WO 00/28449 | 4/1999 |
| WO | EP 0 952 536 A1 | 10/1999 |

OTHER PUBLICATIONS

Random Walk Computer, Inc., White Paper: ECN Aggregators—Increasing Transparency and Liquidity in Equity Markets.*

Actualidad Economica: Free-For All In Electricity Sector? Dialog Article, p. 18, Sep. 30, 1996.

Souter, Gavin. Bermuda's Reinsurers Eager to Please, Dialog Article, Business Insurance, vol. 28, No. 44, p. 77, Oct. 31, 1994.

Guardian, U.K: Branch Closures Hit Poorer Customers, Dialog Article, p. 18, Feb. 11, 1997.

Management Science, vol. 43, No. 12, Dec. 1997, Eric K. Clemons, "Information Technology and Screen-Based Securities Trading".

Wall Street & Technology, vol. 15, No. 3, Mar. 1997, Schmerken, Ivy, "The Pandora's Box over Autoquotes."

Journal of Management Information Systems, vol. 11, No. 2, Fall 1994, Eric K. Clemons and Michael C. Row, "Special Section: Strategic and Competitive Information Systems".

Chicago Board of Trade, "Project A Customer Information Statement".

Alex Frino and Jayaram Muthuswamy, "Price and Time-Priority Versus Pro-Rata Algorithms in Electronically Traded Futures Markets: Simulation Based Performance Characteristics," Oct. 3, 1998.

Estimating the Components of the Bid/Ask Spread; Glosten and Harris; Journal of Financial Economics; May, 1988.

Why Market Maker Position Limits Should be Delta-Based; Ritchie and Ginter; Futures; Aug. 1988.

Default Risk and Innovation in the Design of Interest Rate Swaps; Brown and Smith; Financial Management; Summer 1993.

The Relationship Between Option Trading Intensity and the Market Microstructure of the Underlying Security; Mayhew, Sarin, and Shastri; Leavey School of Business; Mar. 1996.

Eric K. Clemons. Segmentation, Differentiation, and flexibility Pricing: Experience With Information Technology and Segment-Tailored Strategies. Journal of Management Information Systems: pp: 9-36, Fall 1994.

Cosgrove, Suzanne. Courting Retail, Institutional Customers, CBOE, AMEX get Creative. Knight-Ridder Financial News. Date: Jan. 1993.

Michaels, George. Distributed Electronic Ordering System, financial software from Financial Technology Corp. Wall Street Computer Review, vol. 8, No. 11, pp. 53-55. Date: Aug. 1991.

Amihud et al. Liquidity, Asset Prices and Financial Policy. Financial Analysts Journal, vol. 47, No. 6, pp. 56-66. Date Mar. 2000.

Self-Regulatory Organizations: Notice of Proposed Rule Change . . . Introduction of the CBOE Hybrid System F.Reg. vol. 68, No. 77 at 19865-74—CBOE.

SEC to Wall Street, Play Fair with the little guy, Wall Street & Technology, Jan. 1, 1997.

Schmerken, Ivy, The Bulls and Bears come out at night, Dealer's Digest, vol. 7, No. 12, 14, Sep. 1990.

* cited by examiner

AUTOMATED EXCHANGE FOR TRADING DERIVATIVE SECURITIES

RELATED APPLICATIONS

The present invention is disclosed in a provisional application filed under 35 U.S.C. § 111(b) U.S. Patent Application No. 60/106,935, filed Nov. 3, 1998. Priority is hereby claimed under 35 U.S.C. § 119(e) for that earlier filed provisional application. This application is a continuation of U.S. patent application Ser. No. 09/433,613, now U.S. Pat. No. 6,618,707, filed Nov. 2, 1999.

FIELD OF THE INVENTION

This invention relates generally to markets for the exchange of securities, and more particularly to an automated exchange for the trading of options contracts, that equitably allocates trades among market professionals and assures liquidity.

BACKGROUND OF THE INVENTION

The options market first developed in the 1970s. Since that time, options for the purchase and sale of listed stocks have traded domestically only on floor-based exchanges, for example, the American Stock Exchange (AMEX). The method of trading options contracts in these floor-based environments is known as an "open outcry" system because trading takes place through oral communications between market professionals at a central location in open view of other market professionals. In this system, an order is typically relayed out to a trader standing in a "pit." The trader shouts out that he has received an order and waits until another trader or traders shouts back a two-sided market (the prices at which they are willing to buy and sell a particular option contract), then a trade results. In an effort to preserve this antiquated system of floor-based trading, the transition to and use of computer-based technology on these exchanges has been slow. Although some processes that take place on these floor-based exchanges have been automated or partially automated, they are not fully integrated and, in fact, many processes continue to function manually. As a result, there are many problems with the existing floor-based system that have caused large inefficiencies and inadequacies in order handling and price competition in the options market, and have harbored potential for abuse and mistakes.

By way of background, several of the floor-based markets rely on the skills of market professionals, known as specialists, who are responsible for maintaining an orderly market and providing liquidity. Specialists accept orders, establish prices for a particular series of options and allocate trades among market professionals. In return for accepting these responsibilities, specialists oftentimes are assured minimum participation rights in the trading activity that occurs in the pit. As is discussed below, this participation right is not exercised over the smaller-size public customer market orders that trade with the single display systems. Instead, it is up to a specialist to claim the minimum amount of trading through the orders that are routed into the pit for trade-by-trade execution.

Specialists are part of a larger class of market professionals, known as market makers, who like specialists, are responsible for maintaining liquidity in the market. Market makers fulfill this responsibility by ensuring that there is always a two-sided market through calling out prices (quotations) at which they are both willing to buy (bid) and sell (offer) a particular option contract and honoring those quotations when trading with incoming orders. In the traditional open outcry system, market makers call out these quotations each time an order is routed into the trading pit. Over time, each of the existing options exchanges has developed systems to track the best quotation. What generally happens is that market makers call out quotations which are manually entered into a system that tracks and displays the single best bid and best offer for the entire trading pit at any given time. As the market makers continue to call out new quotations, the system is updated to reflect the current best bid and best offer. In their existing state, these quotation systems do not track or identify which market maker called out the quote currently displayed or the number of contracts (size) for which the market maker is willing to honor at that quotation. As is discussed below, these systems simply display a single quotation for the entire pit that is generally understood to be valid (firm) for only smaller-sized orders, for example 10 contracts, and for only certain types of orders, for example public customer orders entered on an exchange for immediate execution at the existing market price (the best bid or offer) known as "market orders." The floor-based exchanges generally have procedures for the automatic execution and allocation of these smaller-sized public customer market orders at the displayed quotations through a rotation assignment of the orders among the pit market makers.

Execution through use of the displayed quotation and automatic allocation to market makers does provide a guaranteed market for incoming smaller-sized public customer market orders. However, this system does not provide an incentive for members to make quotations for size larger than the minimum, i.e., 10 contracts from the above example. In fact, often these automatic allocation systems do not permit market makers to make quotations for larger size. Further, because the bid and offer prices for these allocation systems are set by a single quotation, the existing best bid and best offer may not always accurately reflect the desire of each and every market maker, which makes it difficult for market makers to change the quotation to reflect changes in the market. If the market for the option becomes volatile, for example, when the price of the underlying stock fluctuates or if a market maker simply changes his opinion on what a fair price for that option should be, market makers risk being forced to trade at a disadvantageous price displayed on the single quotation system.

On the other hand, market makers must trade at the displayed market price or else update the quoted price if they wish to improve the market. However, members have no incentive to quote a price that improves the market, i.e. quote a higher bid or lower offer than the current displayed market price, because these systems allocate public customer market orders to market makers in turn through a rotation process. Therefore, to what extent an individual market maker is allowed to participate in a particular order is a matter of chance and whether a market maker who quotes a better market is able capture the benefit of his quotation in a particular option series depends upon his location in the allocation rotation.

The ability for a market maker to act independently and to make deep liquid markets is severely inhibited by these single quotation allocation systems. The inherent inadequacies in these single quotation systems stem from the fact that individual market makers' quotations and size are not tracked or identified. As well the size that market makers are willing to trade at the next best prices (prices lower than the best displayed bid or higher than the best displayed offer) is not tracked or identified. These deficiencies make it difficult to assess market depth and liquidity and ultimately impact that quality of the prices customers receive for their orders. What is more, because no record of market quotations exists beyond the single quotation system it is virtually impossible to accurately recreate and document historical market conditions.

As discussed above, these existing single quotation systems generally provide a guaranteed market at the currently displayed best bid or best offer only for incoming smaller-sized public customer market orders. The execution and allocation procedures, however, are not honored for orders not meeting this criteria. Instead, non-marketable orders where a particular price is bid or offered (limit orders), orders above the minimum size, and orders placed by professionals (professional orders), for example, broker-dealers trading for firm accounts and market makers trading from other options exchanges, frequently continue to be quoted on a case-by-case basis by the market makers in the pit. These orders, therefore, do not even receive the benefit of the single quote allocation systems, which despite their shortcomings, at least afford an opportunity for quicker execution at guaranteed prices. In addition, in periods of high volatility or order volume, or similar circumstances in the trading of the underlying security, a procedure known as a fast market may be instituted. When a fast market exists, the displayed quotations are not honored and market professionals generally revert to quoting incoming orders one series at a time until the condition ultimately subsides.

When a limit order cannot be filled immediately either because the price bid or offered is outside the market or because there is inadequate size to fill the order at the volume ordered, the order is placed on a "book." A book, more accurately a limit book, is a record of outstanding public customer limit orders that can be matched against future incoming orders. Professional orders are usually not allowed on the limit book. At the existing options exchanges, these limit books may be maintained in a manual and/or electronic format. The current systems, however, generally are not integrated with the single quotation systems. Because the systems stand apart, the best bid and best offer for quotations is calculated separately from the best bid and best offer for the limit book. Moreover, professional orders are not generally accounted for in either of these two calculations. As a result, in instances where the limit book matches or betters a displayed quotation, incoming market orders are not traded automatically. In those cases, incoming smaller-size customer market orders utilizing a display quotation system instead must be "kicked out" and announced to the trading pit in open outcry or manually executed against the limit book.

Broadcast of orders on the floor on a case-by-case basis can create a disadvantage for parties wishing to place larger orders. First, trading is not anonymous. Therefore, market makers in the trading pit are able to determine to some extent the identity of the party placing the order and, as a result, oftentimes condition what they are willing to quote on, for example, whether the order is from a public customer or a market professional. Second, the fact that an order for a larger number of options contracts has been placed can have an effect on the price of the underlying stock. Persons overhearing the order placed on the floor market can "trade ahead", that is, buy or sell the underlying stock in anticipation of the owner of the options contracts exercising its options. Trading ahead violates market rules, however, because a large number of people are aware of orders placed on floor markets, effective policing of parties that trade ahead is impractical.

Under the current infrastructure, there is little accountability amongst the individual market makers to make two-sided markets with size and continuously call out quotations. The single quote display systems, on the one hand, looks to the crowd and not individuals to maintain the quotations. The traditional open outcry process, on the other hand, provides market makers with the opportunity to react to whichever orders they want to respond and to determine how they want to respond. For example, with incoming orders not routed through the single quote display systems, market makers often distinguish between public customer and professional orders and vary the quotations they are willing to trade at after learning of the order type, not before. What is more, market makers do not quote size for which they are willing to trade at the next best prices (lower than the best bid and higher than the best offer) or make distinctions on what they are willing to trade with other market professionals at the next best prices.

Beyond the trading processes internal to each option exchange, additional considerations arise when an option is listed on multiple exchanges. In order to assure that an order in a multiply-listed contract receives the best execution price, market professionals are charged with the responsibility of checking the other exchanges' quotations for prices better that the exchange's best bid or best offer and with the responsibility of contacting the other exchange to verify that the quotations are valid. If better quotation exists at another exchange, that exchange's market participants must either trade at that price or change (fade) the quotation. The incoming order is generally not automatically processed and must addressed on a case-by-case basis. This entire process of checking other exchange quotations is dependent upon the originating exchange market professionals' personal efforts to verify the other markets' quotations each time an order comes into the trading pit.

The increasing volume of trades in options contracts, as well as the speed at which price information of underlying stocks is transmitted to consumers, has increased the demand for faster trade execution in today's market. In addition, volatility in the price of underlying stocks that are the basis for options contracts place further pressure on exchanges to execute trades quickly and at an equitable price. Market makers on floor-based markets are limited in the speed at which they can react to market fluctuations and respond with quotations. This limited response speed leads to greater market volatility and lower liquidity because the market makers are less willing to risk trading large numbers of contracts where the price may not be optimal. The disjointed nature of the various manual, and sometimes automated, systems which take place on floor-based exchanges cultivate these deficiencies and, again, make it difficult to assess the true market depth and liquidity and ultimately impact that quality of the prices.

SUMMARY OF THE INVENTION

It is an advantage of the invention to provide an automated system for matching previously entered orders and quotations with incoming orders and quotations on an exchange for securities, which will improve liquidity and assure the fair handling of orders.

It is a further advantage of the invention to provide an automated exchange for securities wherein an incoming order is filled first against public customer orders and then filled against professional orders and quotations on a pro rata basis based on the size of the professional order or quotation.

It is yet another advantage of the invention to provide an automated exchange for the trading of securities wherein a primary market maker also known as a specialist is given a relatively higher portion of the pro rata order volume, the primary market maker being a market maker with additional responsibilities toward maintaining an orderly market.

It is yet another advantage of the invention to provide an exchange that automatically moves the price of a market maker's quotation one or more trading increments worse that the quotation price after the size of the quotation has been exhausted, such new quotation having a predetermined size that is dependent upon the price of the new quotation.

It is yet another advantage of the invention to provide an exchange that automatically guarantees a predetermined minimum number of contracts at the market price by placing a derived order for a primary market maker at the market price so that the total size at that price will be at least the predetermined minimum number of contracts.

It is another advantage of the invention to provide an automated exchange for securities that employs an automated away market process to assure that orders eligible for away market protection are executed at prices better than or equal to away market prices.

It is another advantage of the invention to provide an automated exchange for securities that employs an automated fast market process to reduce volatility in the market and assure that orders are executed at fair prices.

It is another advantage of the invention to provide an automated exchange for securities that employs an automated opening process to assure that orders entered on an opening are executed at a fair price and that opening quotations accurately reflect the market interests.

It is yet another advantage of the invention to provide an automated exchange for securities that employs a block order process to assure that larger-sized orders are executed at a fair price.

It is another advantage of the invention to provide an automated exchange for securities that employs a facilitation process to assure that larger-sized orders are executed at a fair price while guaranteeing that a minimum percentage of a larger-sized order is traded by the market professional who entered the larger-sized order, after any public customer orders at the best price or prices are executed.

ADVANTAGES OF INVENTION

It is another advantage of the invention to provide a quotation matching process whereby bid quotation and ask quotations are not immediately executed to provide an opportunity for automatic quotations system to adjust their prices before trading with a quotation generated by a faster automatic quotation system.

It is yet another advantage of the invention to provide a process whereby the size of a market maker's quotation may be automatically increased when its has a quotation at the best price and the aggregate size of the best price would fall below a minimum size, or else automatically lower the price of the quotation in the case of a bid and raise the price of the quotation in the case of an offer according to parameters established by the market maker.

It is another advantage of the invention to enable market makers to establish parameters which limit the amount of a quotation that should be made available to execute against different types of orders.

Broadly, an exchange for matching securities according to the invention stores a plurality of orders from public customers and market professionals, as well as quotations from market makers in a book memory and automatically matches incoming orders and quotations with those stored orders and quotations.

According to one option, orders stored in the book memory from public customers at the best price are matched first and, when all stored public customer orders at the best price have been matched, then professional orders and quotations are matched on a pro rata basis.

According to another option, where the size of an incoming order is less than a small order preference limit, the portion of the order not matched with public customer orders in the book memory at the best price is matched with a primary market maker if it has a quotation at the best price.

According to another option, incoming orders are preferentially allocated to the primary market maker by providing a minimum allocation percentage to the primary market maker's quotations before matching orders and quotations among other professionals.

According to another option, when an incoming order is received that does not match with previously entered orders or quotations and improves upon the best price, but has a size less than a minimum market size, the exchange automatically derives an order for a primary market maker to join the order improving the best price from at least the minimum market size

BRIEF DESCRIPTION OF THE DRAWINGS

Further characteristics, features, and advantages of the present invention will be apparent upon consideration of the following detailed description of the invention, taken in conjunction with the following drawings, and in which.

DETAILED DESCRIPTION

Figure 1:
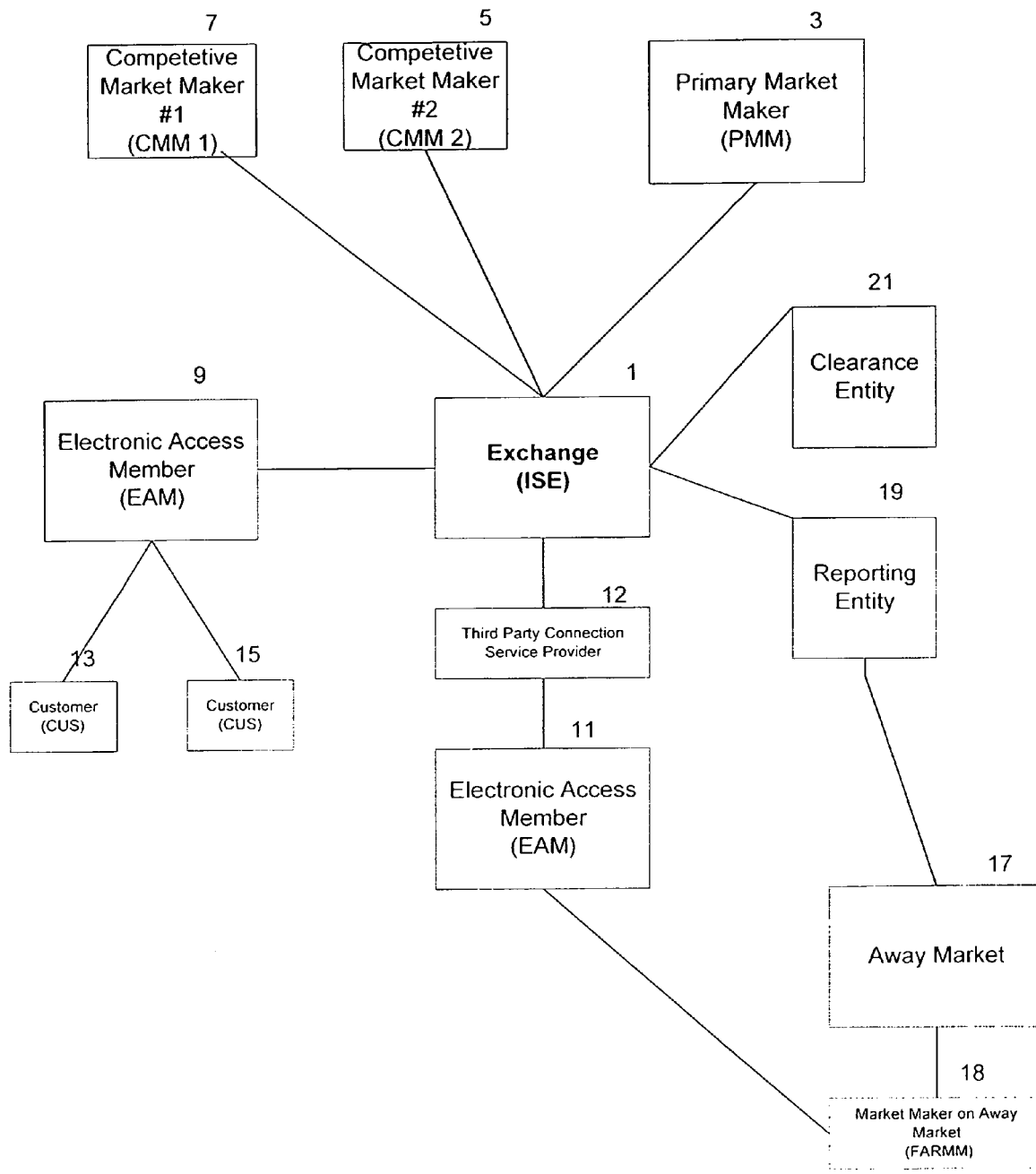
FIG. 1 is a block diagram illustrating an automatic exchange according to an embodiment of the invention interconnected with a plurality of market makers, exchange members, and other entities.

Embodiments of the invention will be described in terms of an automated exchange market for stock options; options being contracts for the purchase or sale of a listed security at a particular strike price to be exercised on a particular date in the future. The invention, however, is not limited to the sale of options contracts and may also be applied to other financial instruments such as stocks, bonds, commodity futures contracts, currency, and the like.

The embodiments will be described in terms of a market for a single option; for example a put for IBM Class A stock expiring on Jan. 15, 1999 with a strike price of 140. It is to be understood that the exchange according to the invention simultaneously provides a market for a series of options for a number of underlying stocks across a range of exercise dates and at a range of strike prices. The vast number of options that can be traded makes the invention particularly advantageous over less automated systems because many of the routine decisions made by professionals in charge of a series of options can be defined in advance and applied automatically.

An automated exchange according to the invention is administered by a business entity, for example, the International Securities Exchange LLC (ISE) of New York, N.Y., which authorizes certain persons as members. The business entity may authorize different types of members or participants, such as a primary market maker (PMM) and one or more competitive market makers (CMMs) to enter quotations in particular classes of options. While there is only one PMM for each class of options traded on the exchange, there may be multiple PMM participants on the exchange, each trading different classes of options. The business entity may also authorize PMMs and CMMs to place orders in options classes traded on the exchange, as well as one or more broker-dealers to enter orders as principal or agent in options classes traded on the exchange, which broker-dealers shall be referred to herein as electronic access members ("EAMs").

Orders entered on behalf of registered broker-dealers, including PMMs, CMMs and EAMs, are referred to herein as professional orders. Orders entered on behalf of market makers on competing exchanges 18 are a particular type of professional order referred to herein as "FARMM" orders. Orders on behalf of any party that is not a registered broker-dealer are referred to as public customers orders.

It is to be understood that the names, types and arrangement of participants and orders are used as examples for purposes of illustration. It is to be understood that the particular arrangement of participants and orders may be varied and remain within the scope of the invention. According to one embodiment of the invention, three distinct type of order are defined, namely public customer orders, professional orders and FARMM orders as defined above. Nevertheless, a greater or fewer number of order types may be defined. The embodiment described herein conform to the rules imposed by a certain type of business entity. It is to be understood that an exchange which conforms, to a different set of rules is nevertheless within the scope of the invention. Further, it is to be understood that the term "exchange" does not limit the use of the invention to an entity that is a registered exchange, that is, the invention may be administered by other types of business entities, such as broker-dealers, associations or others.

FIG. 1 shows an exchange 1 according to an embodiment of the present invention-connected with a number of entities. An order placed on the exchange 1 may be a limit order that specifies an order size, that is, an integral number of contracts, and a bid price or offer price. Alternatively, an order may not specify a bid price or an offer price, in which case the order is referred to as a market order. It is understood that a market order is to be executed at the best available price, which is the highest price in the case of a market order to sell and the lowest price in the case of a market order to buy.

Professional orders and quotations in an options class are communicated to the exchange 1 by the PMM 3, and one or more CMMs 5, 7. One or more EAMs 9, 11 communicate public customer, professional and FARMM orders to the exchange 1. According to one embodiment of the invention, PMMs and CMMs may only enter proprietary quotations and orders, that is they may not enter orders as an agent on behalf of a public customer or another professional.

The exchange 1 is also connected with a reporting entity 19. The reporting entity 19 may be, for example, the Options Price Reporting Authority (OPRA), which collects price and size data for all options traded on exchanges in the United States and provides this data to subscribers. The exchange 1 communicates the prices of each trade to the reporting entity 19. The exchange also communicates the best prices available, that is the highest bid price and the lowest offer price in the book memory 33 discussed below. The reporting entity 19 may also include the Consolidated Trading System/Consolidated Quoting System (CTS/CQS), which collects price data on underlying stock markets. According to one embodiment of the invention applied to the trading of options, the exchange 1 collects data from the reporting entity 19 and uses this information in its automatic trade execution process, described below. Data from the reporting entity 19 is also used to monitor prices of options on other markets 17, as well as that of stocks underlying the options to, among other functions, assess whether a "fast market" condition exists, that is, whether the other exchanges have indicated that due to the volume and/or price volatility of a security, certain of their normal trade execution rules will not apply.

The exchange 1 is also connected with a clearance entity 21. The clearance entity may be, for example, The Options Clearing Corporation (OCC). The clearance entity 21 performs the transactions necessary to clear the trade, including guaranteeing payment to the seller and accountability for the buyer.

Telecommunication links between the exchange and each of the entities 3-21 can be made by any of a number of known electronic data exchange mechanisms. For example, the exchange 1 may communicate to outside entities 3-21 via local area networks, wide area networks, direct electronic or optical cable connections, dial-up telephone connections, or a shared network connection including the Internet using wire and wireless based systems.

Data can be exchanged between the exchange 1 and entities 3-21 via data terminals located at the entities 3-21. Data terminals may be any of a number of known data processing machines, for example, computer workstations, personal computers, minicomputers, mainframe computers, personal digital assistants, web TV boxes, and the like. Terminals at the entities 3-21 include software capable of communication with the exchange 1 using a predetermined data format. According to one embodiment of the invention, data is exchanged with the exchange 1 using OMnet™ API software manufactured by OM Technology AB of Stockholm, Sweden. Data may also be communicated from members to the exchange through the use of third-party services 12 that connect to the exchange. According to the embodiment illustrated in FIG. 1, EAM 11 is connected with the exchange 1 via such a third party communication system 12. The third party communication system may be, for example, an independent order routing and back office service provider.

The exchange 1 may be implemented on a general-purpose computer under the control of a software program. According to one embodiment of the invention, the exchange 1 is implemented on an Open VMS system running the OM Click Exchange™ software manufactured by OM Technology AB. Alternatively, the exchange 1 can be implemented on a network of general-purpose computers each under the control of a separate software program or on a system of interconnected parallel processors. Although complex, it is believed that suitable software for performing the various functions described herein can be designed and constructed by computer programmers of ordinary skill.

Figure 2:
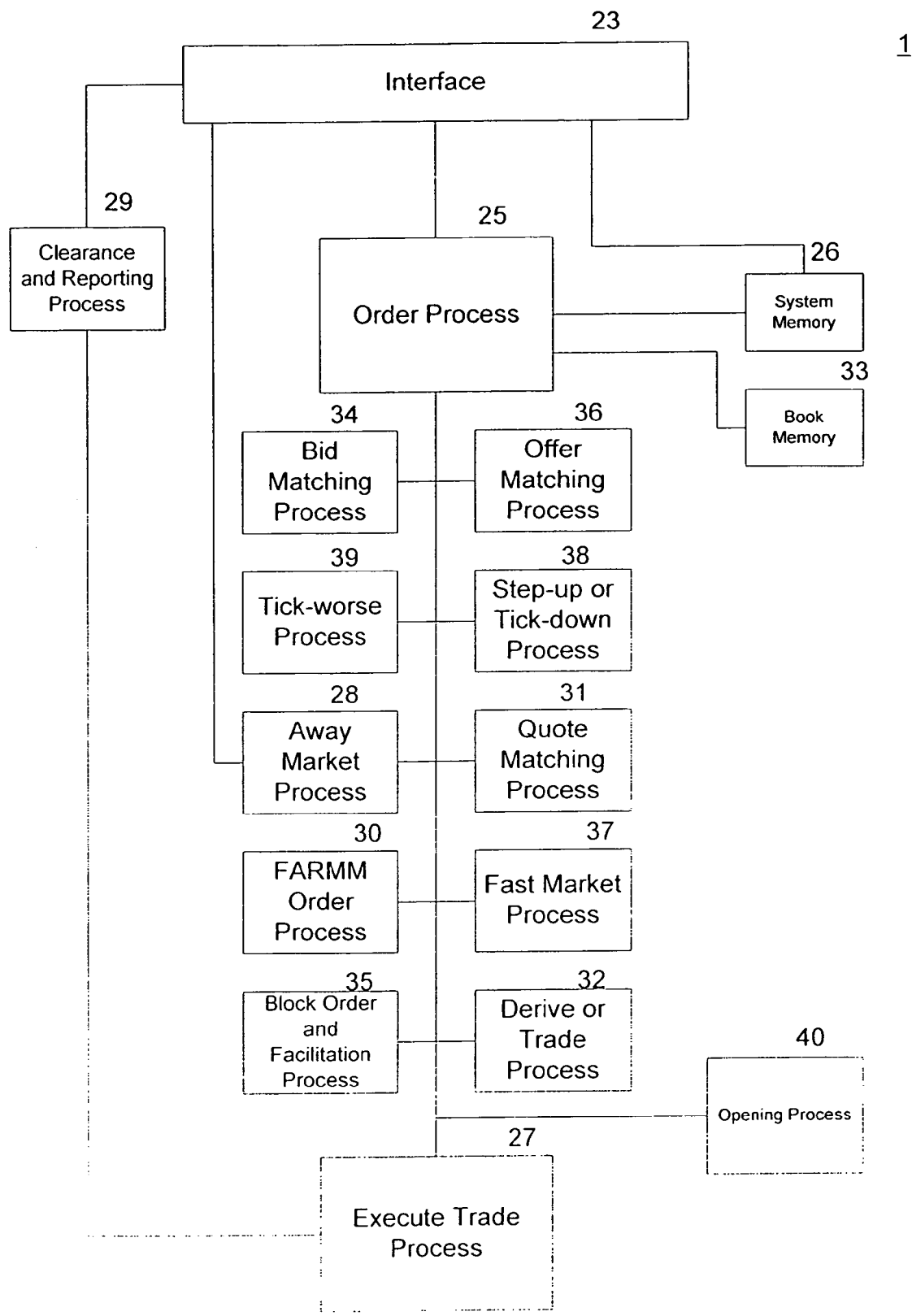
FIG. 2 is a detailed block diagram illustrating the exchange of FIG. 1.

FIG. 2 shows the exchange 1 in detail. Connections between the exchange 1 and entities 3-21 are made via a data interface 23. The data interface 23 performs error checking, data compression, encryption and mediates the exchange of data between the exchange 1 and entities 3-21. Orders and quotations from the PMM 3 and CMMs 5, 7, as well as orders entered by EAMs 9, 11 are placed on the exchange 1 via the interface 23.

Order and quotation information received via the interface 23 from the PMM 3, CMMs 5, 7 and EAMs 9, 11 is sent to the order process 25. The order process 25 first checks to see if the order or quotation is valid according to programmable parameters that reflect the particular trading rules of the entity administrating the invention. For example, according to one embodiment of the invention, if the order were a market order placed by a professional the order would be rejected because trading rules prohibit professional market orders.

The order process 25 checks whether a fast market condition exists and, if so, passes orders to the fast market process 37. The fast market process 37 provides a mechanism to dampen volatility. If it is determined that the trading volume exceeds a certain amount or market volatility would lead to inequitable trades, the exchange 1 can be placed in fast market mode with respect to one or more instruments by storing a fast market parameter in the system memory 26. The fast market process 37 introduces a delay between trades that is determined by the administering entity and may be changed based upon the market conditions so that the appropriate interval can be employed. The fast market process 37 further determines an optimal price for executions based upon orders and quotes that accumulate during the delay, which will serve to dampen price fluctuations and execute trades at equitable prices. The exchange 1 automatically monitors price and volume data received from the reporting entity 19. When the primary market for the underlying stock indicates a fast market, the exchange 1 automatically sets a fast market condition for a predetermined time interval. The fast market process 37 is described in detail below.

The order process 25 varies depending upon whether the order is a public customer order, professional order or FARMM order. Except in the case of a FARMM order, discuss below, the order process 25 checks whether the incoming order can trade against orders and quotations in the book memory 33, that is, whether the terms of an order can be satisfied by a previously entered order or quotation in the book memory 33. For example, if there is an order to sell at 3 in the book memory 33, an incoming market order to buy, or an incoming limit order to buy with a stated price of 3, or higher can trade. If the incoming order can trade and the order is a public customer order, the order process 25 checks the price on the away market 17 as reported by the reporting entity 19 to determine if there is a better price available. Should an away market 17 have a better price for the incoming order, the order process 25 sends the order to the away market process 28.

The away market process 28 either trades the public customer order automatically against the PMM 3 at the same price as the better price in the away market 17 or else stores the order in the book memory 33 and alerts the PMM 3 to the order according to a set of predetermined parameters stored in the system memory 26 by the PMM 3. The order is stored in the book memory 33, but is hidden, that is, the price of the order is not communicated to the reporting entity 19. The hidden order will be executed if an incoming order or quotation can be matched with the hidden order, the away market 17 no longer has a better price, or the PMM chooses to execute the order.

Where the order process 25 determines that there is not a better price in an away market 17, or where the order is a professional order, the incoming order is sent to the bid matching process 34 if it is an order to buy and the offer matching process 36 if it is an order to sell. The bid matching process 34 matches buy orders against orders and quotations to sell that are stored in the book memory 33. The offer matching process 36 matches incoming sell orders against orders and quotations to buy stored in the book memory 33. In both the bid matching process 34 and the offer matching process 36, public customer orders at the best price are executed in time priority before professional orders and quotations at the same price. After public customer orders in the book memory 33 are executed, the bid matching process 34 and the offer matching process 36 apply an algorithm that allocates the remaining size of an incoming order among the professional orders and quotations at the best price. This trade matching algorithm is described in detail below.

Where the order process 25 determines that an incoming limit order cannot trade against orders stored in the book memory 33, or if only a portion of the incoming order can trade, the order process 25 stores the incoming order or unexecuted portion thereof in the book memory 33 unless the order contains an instruction that it should be deleted if it cannot trade with orders in the book memory 33. For example, if the highest bid stored in the book memory 33 (the best bid) is 3 and the lowest offer stored in the book memory 33 (the best offer) is 4, an order to sell with a stated price of 4 cannot trade. If the incoming limit order that cannot trade improves the market, that is if the incoming order is a limit order with a bid price higher than the best bid stored in the book memory 33 or an offer price lower than the best offer stored in the book memory 33, and the size of the order is below a specified number of contracts, the order process 25 sends the order to the derive or trade process 32 if it is a public customer order, or deletes the order if it is a professional order. The derive or trade process 32 ensures that, when the market improving order is stored in the book memory 33, there is at least a minimum market size at the new market price. Under one embodiment of the invention, market rules require that there be at least 10 contracts available at the best price at all times. Thus, if the size of the market improving order is less than 10 contracts, the derive or trade process 32 either supplements the market-improving order with an order derived on behalf of the PMM 3 or else trades the market-improving order against the PMM's account. The order process 25 also sends a public customer order to the derive or trade process 32 if the aggregate size of the best price becomes less than the minimum market size. The derive or trade process 32 is described in detail below.

According to one embodiment of the invention, there are three instances where an incoming limit order that cannot trade is not stored in the book memory 33. First, a limit order may contain special instructions that it should not be stored in the book memory 33. For example, if a limit order is designated as a fill-or-kill order, the order process 25 will delete the incoming order unless the entire size of the order can be traded against the orders and quotations in the book memory 33. Second, if a limit order is designated as a immediate-or-cancel order, the order process 25 will delete any portion of the incoming order that cannot trade against the orders and quotations in the book memory 33. Finally, according to this embodiment, a professional limit order that cannot trade entirely at a prices that is within two trading increments below the best bid or above the best offer is deleted by the order process 25, that is, no portion of the professional limit order is traded.

If an order is a FARMM order, the order process 25 sends the order to the FARMM order process 30. The FARMM order process 30 stores the order in a separate memory process and generates a message to the PMM 3 and CMMs 5, 7 that a FARMM order has been received. The PMM 3 can determine to send the FARMM order to the bid matching process 34 or offer matching process 36, or the PMM 3 can determine to execute the FARMM order.

The order process 25 sends quotations to the bid matching process 34 or the offer matching process 36 if the quotation can trade with an order on the book memory 33. If a quotation would match against a quotation stored in the book memory 33, the order process 25 sends the quotation to the quotation matching process 31. If a quotation cannot trade, the order process 25 stores the quotation in the book memory 33. The quotation matching process 31 will not immediately execute an incoming quotation with a quotation that is stored in the book memory 33. Rather, according to one embodiment of the invention, the exchange 1 stores a programmable parameter that indicates the amount of time that the bid matching process 34 and the offer matching process 33 will wait before matching an incoming quotation with a quotation stored in the book memory 33. The quotation matching process is described in detail below.

Quotations entered by a PMM 3 or CMM 7, 5 contain a, size parameter table which instructs the order process 25 the percentage of the size of a quotation and the absolute number of contracts that should be made available to execute against professional orders or quotations, and that percentage of the size of a quotation and the absolute number of contracts that should be made available to execute against FARMM orders. For example, a PMM 3 that enters a quotation to buy 60 contracts at 4, can indicate in the quotation size parameter table that the lesser of 50% of the size of the quotation or 20 contracts should be made available to be executed against a professional order or quotation and that only 25% or 35 contracts should be made available to be executed against FARMM orders. In this example, the PMM's quotation can be executed against at 4 by professional orders for a total of 20 contracts (the lesser of 50% of 60 and 20) and executed against at 4 by FARMM orders for a total of 15 contracts (the lesser of 25% of 60 and 35 contracts). The PMM will never execute more than 30 contracts total at 4, so that if the size of the quotation is reduced to 15, the PMM's quotation can not be executed against by any type of order for more than 15 contracts. If the size available for execution against a professional order or quotation or the size available to execute against a FARMM order is reduced to zero, the order process will initiation the tick-worse process 39 if a professional order or quotation or FARMM order attempts to match at the quotation price.

The block order and facilitation process 35 is an optional process that an EAM 9, 11 can choose to use when executing large-size orders. The size of an order eligible for the block order and facilitation process is variable and can be set by the entity administering the exchange 1. Block orders are sent by the order process 25 to the block order and facilitation process 35. The block order and facilitation process 35 sends a message containing certain information describing the order to the PMM 3 and CMMs 5, 7, as well as to EAMs 9, 11 with proprietary orders at the best price. The block order and facilitation process 35 allows those participants that received the message to enter individual bids or offers against the block order in the form of anonymous messages that are stored in a separate memory function, that is, such messages do not interact with orders and quotations stored in the book memory 33 and are not part of the bid matching process 34 or offer matching process 36. Because block trade information sent to participants does not include the entering broker or customer information, the party placing the block trade maintains anonymity, and because the messages are not communicated outside of the system, the participants that respond with bids and offers maintain anonymity.

Parties receiving the block order information respond within a limited time period with bids and offer messages. At the expiration of the time period, the block order and facilitation process 35 calculates the best possible execution price for the block order and allocates the block order among the responders, as well as orders and quotations stored in the book memory 33, according to the algorithm contained in the bid matching process 34 and offer matching process 36. Block orders must contain a stated price. A block order may be designated as a fill-or-kill order, that is, a trade should take place only if the entire size of the order can be executed at the stated price of the order or better. If no trade is possible at the stated price or better, or if there is insufficient volume to execute the entire size of an order that is designated fill-or-kill, the block order and facilitation process 35 deletes the block order and any responses. If only a portion of a block order that is not designated fill-or-kill is executed, the block order and facilitation process 35 deletes the unexecuted portion of the block order and any unexecuted responses.

A facilitation order is a block order that the entering EAM 9, 11 wishes to trade against its own proprietary order. Facilitation orders entered into the block order and facilitation process 35 are handled the same as block orders as described above, except in the case of a facilitation order, the block order and facilitation process 35 uses an algorithm that allocates all or a portion of the facilitation order against the EAM 9, 11 that entered it. Further, in the case of a facilitation order, the order is always executed in full because the EAM 9, 11 entering the order commits to executing any amount of the order that is not executed by other participants. The block and facilitation process 35 is described in detail below.

Orders and quotations that have been executed are sent to the execute trade process 27. The execute trade process 27 instructs the order process 25 to remove the matched order from the book memory 33, and sends a message to the participants that submitted the matched orders or quotations. The execute trade process 27 also sends trade information to the clearance and reporting process 29. The clearance and reporting process 29 sends the executed trade information to the reporting entity 19 and the clearance entity 21 via the interface 23.

The final two process in FIG. 2 are the tick-worse process 39 and the step-up or tick-worse process 39, both of which apply to quotations entered by a PMM 3 or CMMs 5, 7. The tick-worse process 39 automatically changes the price and size of a quotation in the book memory 33 when the size of the quotation in the book memory 33 is reduced to zero. The tick-worse process 39 determines the new price and size according to parameters entered by the PMM 3 or CMM 5, 7. These parameters are stored in the system memory 26 with respect to each quotation entered by a PMM 3 or CMM 5, 7. The new quotation price is one or more trading increments lower for a quotation to buy and one or more trading increments higher for a quotation to sell. The step-up or tick-down process 38 increases the size of a quotation at the best price when the aggregate size of the best price would be less than the minimum market size according to parameters entered by the PMM 3 or CMM 5, 7, or sends the quotation to the tick-worse process 39. The tick-worse process 39 and the step-up or tick-down process 38 are described in detail below.

Figure 3A:
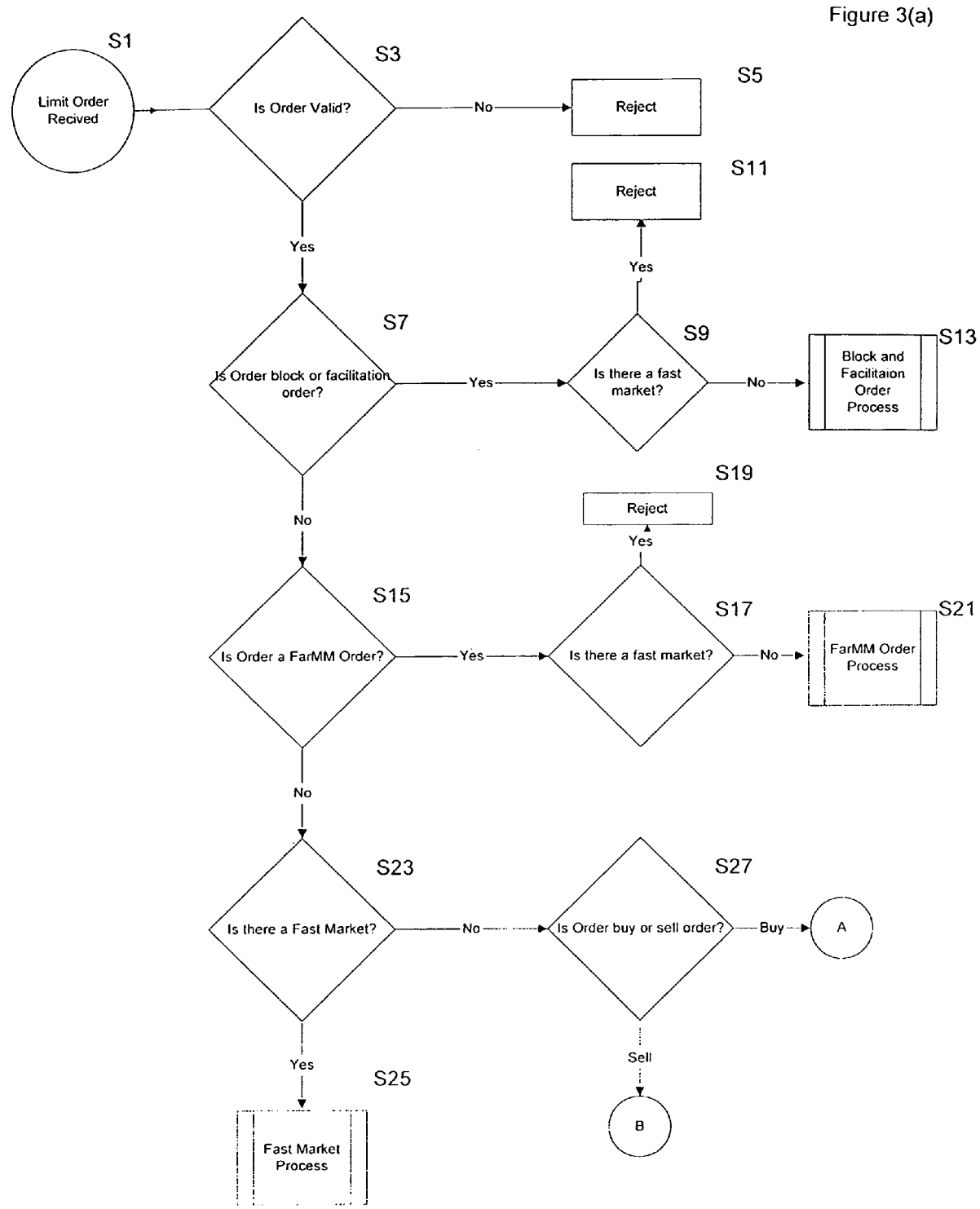
FIGS. 3 through 13 are flow charts showing processing by the exchange of FIG. 1.
Figure 3B:
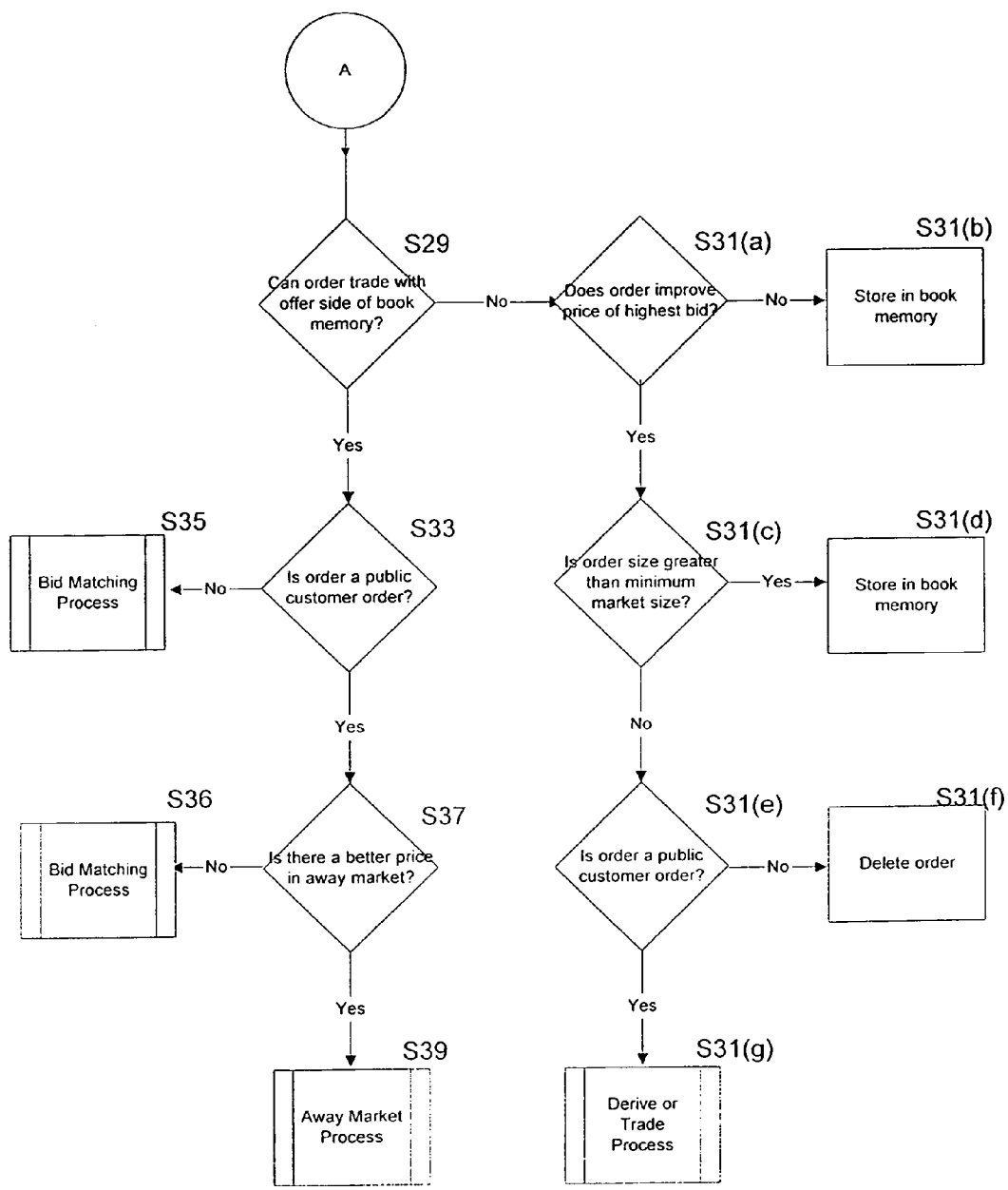
Figure 3C:
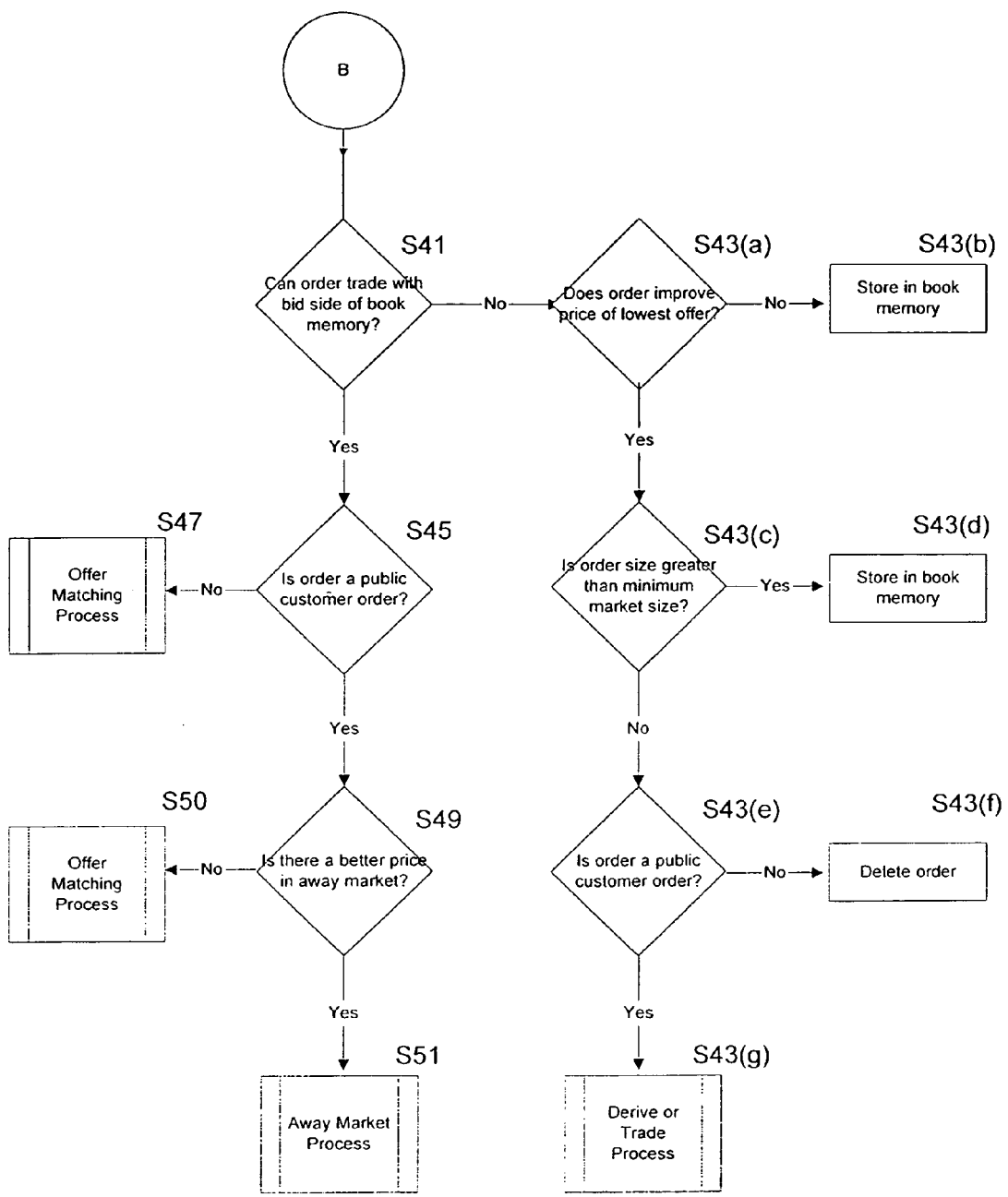

FIGS. 3(a) through 3(c) illustrating the trading process within the exchange 1 for a limit order. An order is received at step S1 by the interface 23 and passed to the order process 25. At step S3 of FIG. 3(a), the order process 25 determines whether the incoming order is valid. If the incoming order is not valid, the order process 25 rejects the incoming order at step S5 and sends a message to the party placing the incoming order indicating that the order was rejected.

If the order is valid, then the order process 25 determines at step S7 whether the order is a block or a facilitation order. If the order is either of these, the order process 25 determines at step S9 whether the exchange is in a fast market mode, and if it is, the order process 25 rejects the incoming order at step S11 and sends a message to the party placing the incoming order. If the exchange is not in a fast market mode, the block order and facilitation process 35 is initiated at step S13.

If the incoming order is not a block order or a facilitation order, the order process 25 determines at step S15 whether the order is a FARMM order. If the order is a FARMM order, the order process 25 determines at step S17 whether the exchange is in a fast market mode, and if it is, the order process 25 rejects the incoming order at step S19 and sends a message to the party placing the incoming order. If the exchange is not in a fast market mode, the FARMM order process 30 is initiated at step S21.

If the incoming order is not a FARMM order, the order process 25 determines at step S23 whether the exchange is in a fast market mode, and if it is, the order is handled according to the fast market process 37 at step S25. If the exchange is not in fast market mode, the order process 25 determines at step S27 whether the incoming order is an order to buy or to sell.

If the incoming order is an order to buy, the order process 25 determines at step S29 of FIG. 3(b) whether the incoming order can trade with the offer side of the book memory 33. If the order cannot trade at step S29, the order process 25 determines at step S31(a) whether the order would improve upon the best bid, that is, whether the price of the order is higher than the highest order or quotation to buy stored in the book memory 33, and if it is not, the order process 25 stores the order in the book memory 33 at step S31(b). If the order would improve upon the best offer, the order process 25 determines at step S31(c) whether the size of the order is equal to or greater than the minimum market size stored in the system memory 26, and if it is, stores the order in the book memory 33 at step S31(d). If the order is less than the minimum market size, the order process 25 determines at step S31(e) whether the order is a public customer order, and if it is not, deletes the order at step S31(f). If the order is a public customer order the order process 25 sends the order to the derive or trade process 32 at step S31(g).

If the incoming order can trade with the offer side of the book memory 33 at step S29, the order process 33 determines at step S33 whether the order is a public customer order, and if it is not, the bid matching process 34 is initiated at step S35. If the incoming order is a public customer order, the order process 25 determines at step S37 whether there is a better offer in the away market 17, and if there is not, the bid matching process 34 is initiated in step S36. If there is a better price in the away market at step S37, the order process 25 sends the order to the away market process 28 at step S39. The order process 25 will skip step S37 and send the order directly to the bid matching process 34 if the away market process 28 has been disabled at the exchange.

If the incoming order is an order to sell at step S27, the order process 25 determines at step S41 of FIG. 3(c) whether the incoming order can trade with the bid side of the book memory 33. If the order cannot trade at step S41, the order process 25 determines at step S43(a) whether the order would improve upon the best offer, that is, whether the price of the order is lower than the lowest order or quotation stored in the book memory 33, and if it is not, the order process 25 stores the order in the book memory 33 at step S43(b). If the order would improve upon the best offer, the order process 25 determines at step S43(c) whether the size of the order is equal to or greater than the minimum market size stored in the system memory 26, and if it is, stores the order in the book memory 33 at step S43(d). If the order is less than the minimum market size, the order process 25 determines at step S43(e) whether the order is a public customer order, and if it is not, deletes the order at step S43(f). If the order is a public customer order the order process 25 sends the order to the derive or trade process 32 at step S43(g).

If the incoming order can trade with the bid side of the book memory 33 at step S41, the order process 33 determines at step S45 whether the order is a public customer order, and if it is not, the offer matching process 36 is initiated at step S47. If the incoming order is a public customer order, the order process 25 determines at step S49 whether there is a better bid in the away market 17, and if there is not, the offer matching process 36 is initiated in step S50. If there is a better price in the away market at step S49, the order process 25 sends the order to the away market process 28 at step S51. The order process 25 will skip step S49 and send the order directly to the offer matching process 36 if the away market process 28 has been disabled at the exchange.

Figure 3D:
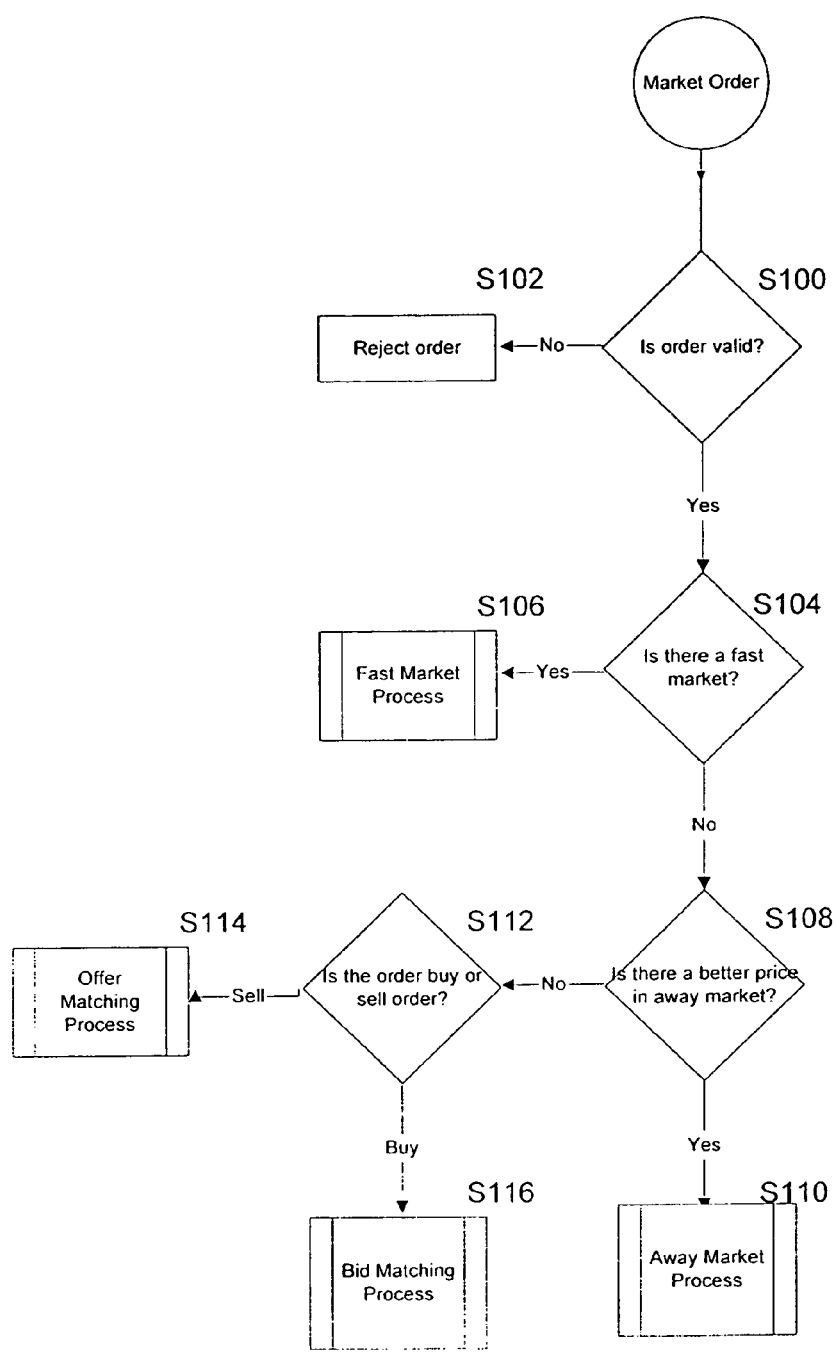

FIG. 3(d) illustrates the trading process within the exchange 1 for a market order. A market order is received at step S100. The order process 25 determines at step S100 whether the order is valid, and if it is not, rejects the order at step S102. If the order is valid, the order process 25 determines at step S104 whether the exchange is in fast market mode, and if it is, sends the order to the fast market process 37 at step S106. If the exchange is not in fast market mode, the order process 25 determines at step S108 whether there is a better price in an away market 17, and if there is, sends the order to the away market process 28. If there is not a better price in an away market 17, the order process 25 determines at step S112 whether the order is to buy or sell. If the market order is a sell order, the order process 25 sends the order to the offer matching process 36 at step S114. If the market order is a buy order, the order process 25 sends the order to the bid matching process 34 at step S116. The order process 25 will skip step S108 and move directly to step S112 if the away market process 28 has been disabled by the exchange.

Trade Matching

The exchange 1 according the to the invention matches incoming orders with orders and quotations stored in the book memory 33. The order process 25 initiates the bid matching process 34 and the offer matching process 36, which contain rules that give priority to public customer orders at the best price, then allocate any remaining part of an incoming order or quotation among the professional orders and quotations on a pro rata basis. Specifically, incoming orders that match a public customer order on the book are traded first against the public customer order. If more than one public customer order is on the book at the same price, priority is assigned on the basis of entry time and trades are done on a first in, first serve basis. That is, public customer orders received earliest are traded first.

Limit orders that cross over the best price on the book will trade at the best price to the extent of the size on the book at the best price. For example, if the best order or quotation to buy in the book memory 33 is 4 for a total size of 20, a limit order to sell 10 at a stated price of 3½ will match at 4. Where the incoming order is greater than the size of the orders and quotations on the book at the best price, the bid matching process 34 and the offer matching process 36 will, using the priority rules discussed in the previous paragraph, first trade the incoming order against the orders and quotations at the best price and then trade the balance of the incoming order against the orders and quotations on the book at the next worse price. The process will continue until there is no more volume left in the incoming order, or there is no longer an order or quotation in the book memory 33 that can match the price of the incoming order. If there is still volume left in the incoming order and all orders and quotations on the book that can match the incoming order have been filled, the remaining volume of the incoming order is placed in the book memory 33, and this order sets a new best price.

Where both public customer orders and professional orders and quotations are at the best price the bid matching process 34 and offer matching process 36 first fills the public customer orders. If the incoming order is below a predetermined size, for example, 5 contracts, then after public customer orders have been filled, the PMM 3 will trade exclusively the remaining size of the order if it has a quotation in the book memory 33 at the best price. When the incoming order is for more than the predetermined PMM small order preference size, the bid matching process 34 and the offer matching process 36 allocate the trade among the professional orders and quotations at the best price according to an algorithm stored in the system memory 26.

Figure 4A:
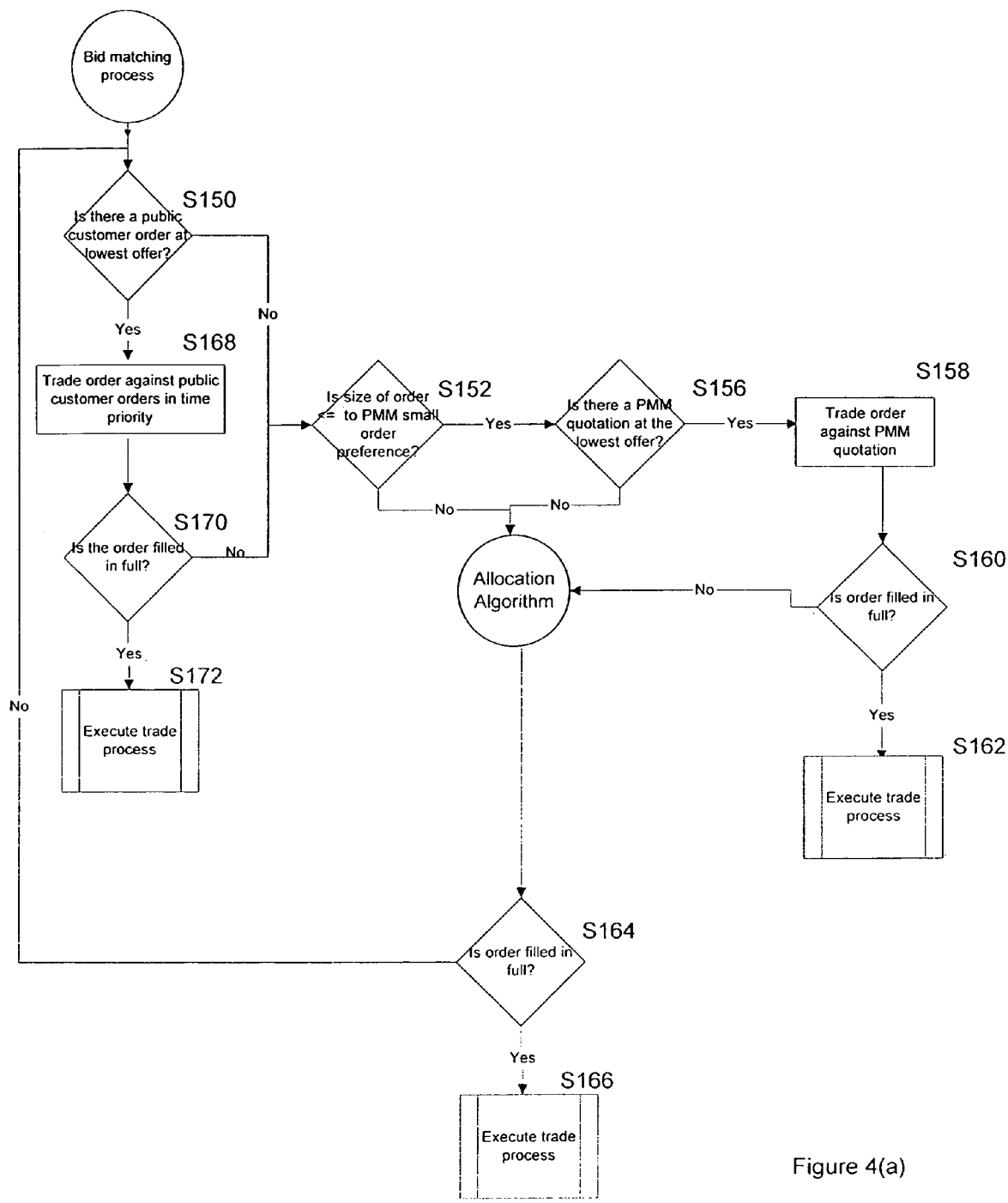
Figure 4B:
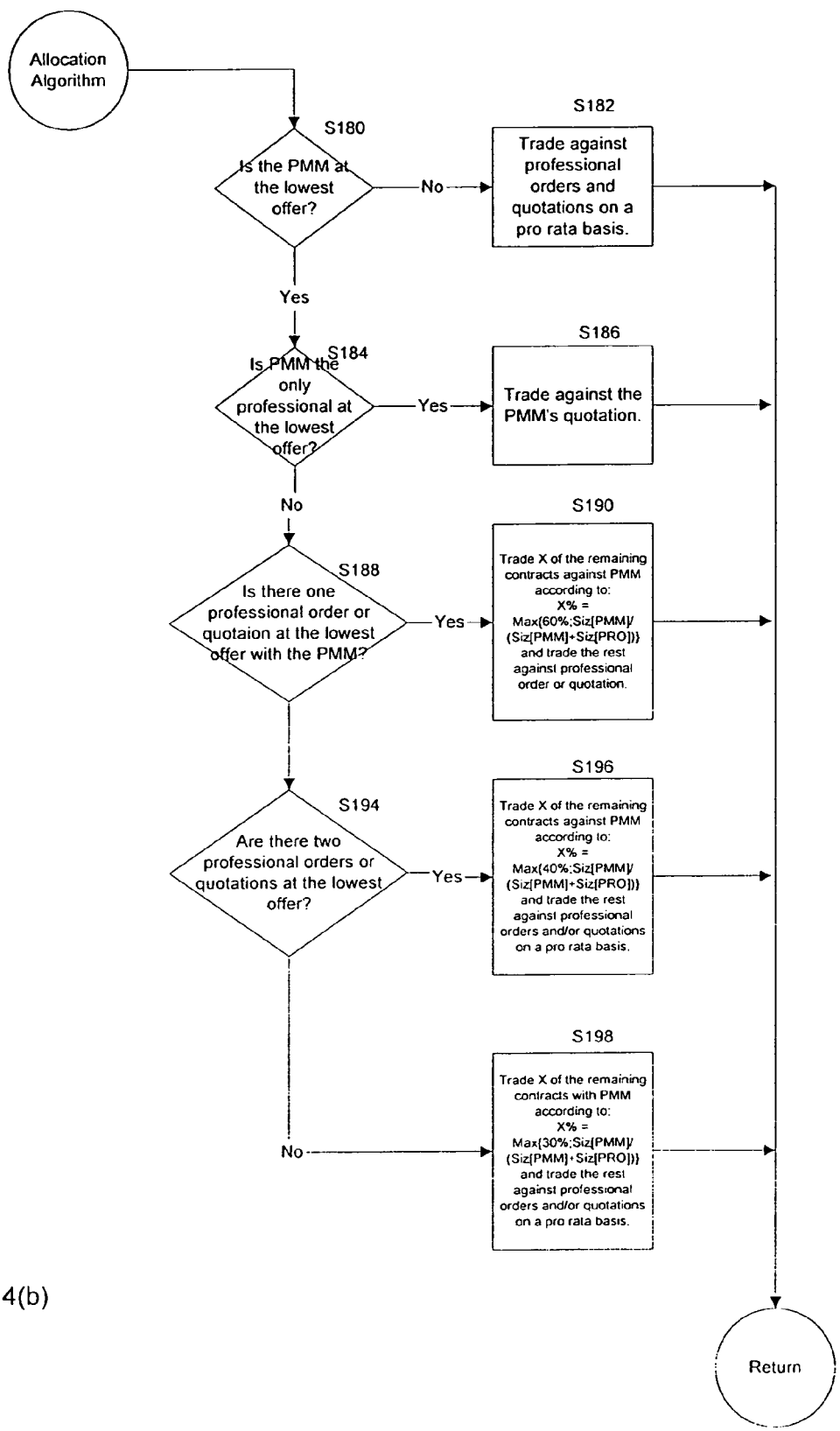
Figure 5A:
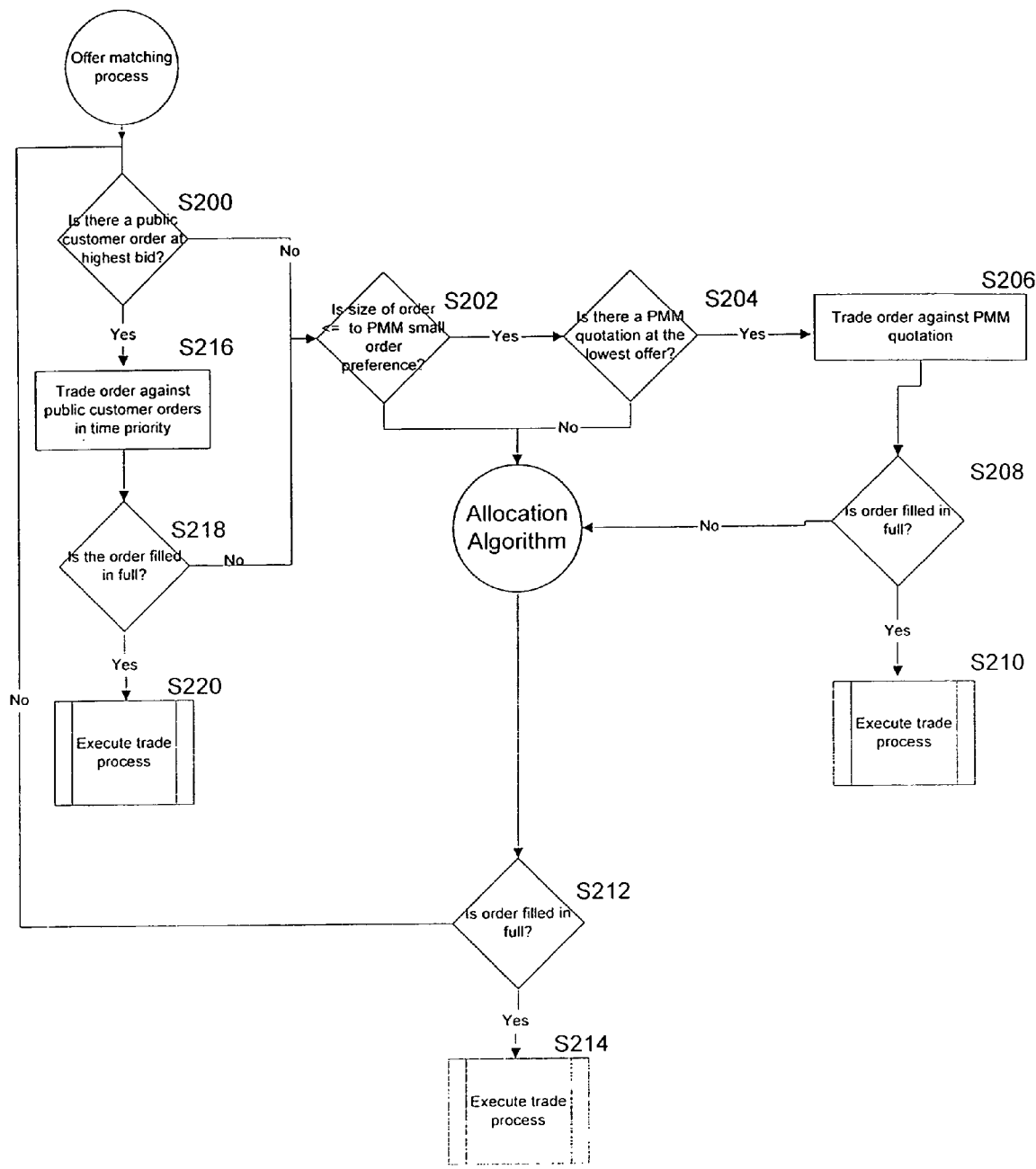
Figure 5B:
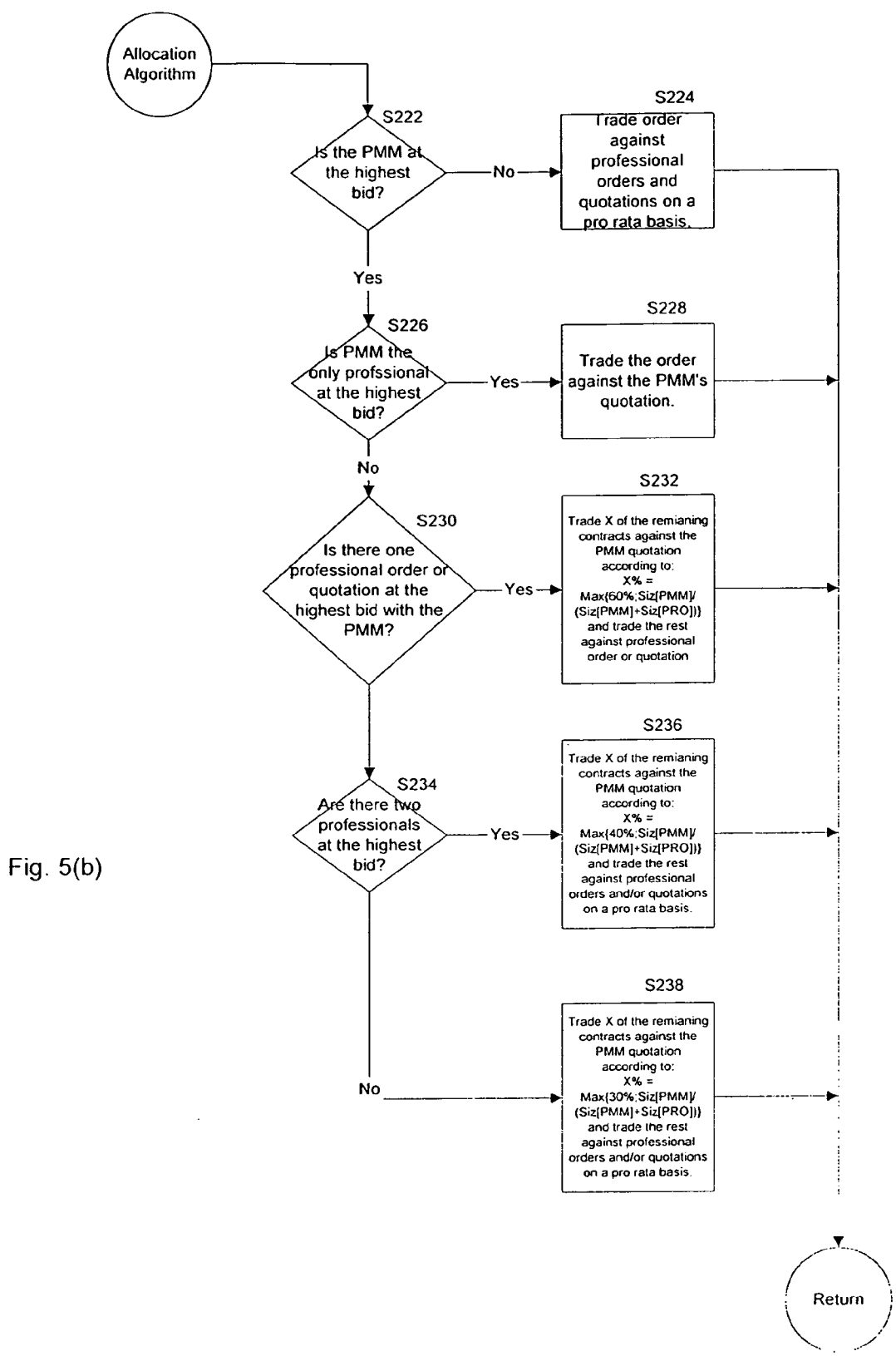

FIGS. 4(a)-4(b) illustrate an embodiment of bid matching according to the invention. FIGS. 5(a)-5(b) illustrate an embodiment of offer matching according to the invention. The operation of bid and offer matching will be described in terms of a number of examples of incoming orders made against orders and quotations stored in the book memory 33. For these examples it is assumed that the incoming orders are not block or facilitation orders and no fast market condition exists. Further, it is assumed that there are no better prices on away markets 17.

TABLE I

| BID | | | | | OFFER | | | | |
|---|---|---|---|---|---|---|---|---|---|
| CUS | PRO #1 | PMM | Total | Price ($) | Price ($) | Total | CUS | PRO #1 | PMM |
|  | 10 | 10 | 20 | 3 | 3½ | 35 | 10 | 5 | 20 |
| 10 | 20 |  | 30 | 2½ | 3¾ | 10 |  | 10 |  |

Table I shows an example of a portion of the book stored in the book memory 33. As shown in Table I, a total of 20 contracts have been bid at 3 and a total of 30 contracts have been bid at 2½. PRO #1, a professional for example, an EAM 9, 11 trading on its own account, has entered an order to buy 10 contracts at 3 and the PMM 3 has placed a quotation to buy 10 contracts at 3. A public customer 13, 15 (CUS) has entered an order to buy 10 contracts at 2½ and PRO #1 has entered an order to buy 20 contracts at 2½. The best bid price is 3.

On the offer side of the book, a public customer has entered an order to sell 10 contracts at 3½. PRO #1 has placed an order to sell 5 contracts at 3½ and 10 contracts at 3¾. The PMM 3 has entered a quotation to sell 20 contracts at 3½;2. The best offer price is 3½.

As a first example, assume that an incoming order to buy 4 contracts at 3½ is sent to the bid matching process 34 by the order process 25. The bid matching process 34 determines at step S150 of FIG. 4(a) that there is a public customer order at the lowest offer. The bid matching process 34 trades the incoming order to buy 4 contracts with the public customer order in the book memory 33 at step S168. At step S170, the bid matching process determines that all 4 contracts in the incoming order have be matched. The match between the incoming order and the customer order in the book memory 33 is sent to the execute trade process 27 in step S172.

As a second example, assume the same book as shown in Table I and an order to buy 30 contracts at 3½ is sent to the bid matching process 34. As shown in FIG. 4(a), the bid matching process 34 completes step S168 as above, matching 10 contracts of the incoming order with the public customer order to sell 10 contract at 3½. At step S170, however, the bid matching process 34 determines that there are still 20 contracts of the incoming order remaining and therefore moves to step S152. At step S152, the bid matching process 34 determines that the original size of the incoming order was greater than the PMM small order preference size, which is assumed to be 5 contracts for the purpose of this example. The bid matching process then applies the allocation algorithm as illustrated in FIG. 4(b).

FIG. 4(b) shows an allocation formula for matching incoming orders against quotations and professional orders at the best price, i.e., the lowest offer. According to this example, steps S180, S184 and S188 determine that there is one professional along with the PMM at the best price. According to one embodiment of the invention at step S190 balance of the incoming order of 20 contracts is allocated among the PPM 3 and PRO#1 according to the following formula:

$$X\% = \max[60\%, siz[pmm]/(siz[pmm]+siz[pro])] \qquad \text{Equation \#1}$$

where:

siz[pmm] is the size of the quotation for the PMM 3 at the market price, and siz[pro] is the size of the order for the professional, PRO #1, at the market price.

If X % would result in a fractional allocation, the number allocated is rounded up to the nearest whole number. Other allocation formulas are also possible without departing from the scope of the invention. For example, a minimum percentage greater or smaller than 60% may be selected. Also, the allocations may not be a "straight-line" pro rata formula but may include weighting factors. According to Equation #1, the PMM 3 is entitled to trade 80% of the remaining 20 contracts in the incoming order, i.e., the maximum of 60% and (20/(20+5))=80%. Thus, 16 of the remaining 20 contracts are traded against the PMM's quotation and 4 are traded against PRO #1's order at step S190 of FIG. 4(b). The bid matching process 34 determines at step S164 of FIG. 4(a) that the order has been completely filled and sends the matches to the execute trade process 27.

As a third example, assume that the book memory 33 is as it appears in Table I and a limit order to sell 16 contracts at 3 is sent to the offer matching process 36 by the order process 25. The offer matching process 36 determines at step S200 of FIG. 5(a) that there are no public customer orders at the highest bid price of 3. The offer matching process 36 determines at step S202 that the original size of the incoming order was greater than the PMM small order preference size, which is assumed to be 5 contracts for the purpose of this example, and moves to apply the allocation algorithm. FIG. 5(b) contains a diagram of the same allocation formula discussed above in connection with the bid matching process 34 as applied in the offer matching process 36. At step S222 of FIG. 5(b), the offer matching process determines that the PMM has a quotation at 3 and at steps S226 and S230, that there is one other professional order or quotation, PRO #1, at the same price. The incoming order is allocated according to Equation #1 in step S232. The PMM trades 60% of the order of 16 contracts, rounded up to the next whole contract, or 10 contracts. PRO #1 trades the remaining 6 contracts. In step S212 of FIG. 5(a), the offer matching process 35 determines that the entire order was matched and sends the matches to the execute trade process 27 at step S124.

TABLE II

| | | OFFER | | | |
|---|---|---|---|---|---|
| Price | Total | CUS | PRO #1 | PRO #2 | PMM |
| 2 ½ | 50 | | 10 | 20 | 20 |
| 2 ¾ | 30 | 10 | 10 | | 10 |

Table II shows another example of the book. For clarity only the offer side of the book is shown. Two professionals, PRO #1 and PRO #2, have placed orders along with the PMM 3 quotation and a public customer order to sell. Assume that the order for PRO #1 at 2½ was placed before the order for PRO #2 at 2½ so that PRO #1 has time priority at the lowest offer of 2½. As a fourth example, assume that an incoming customer limit order to buy 10 contracts at 2½ is enter on the exchange 1.

The bid matching process 34 proceeds as shown in FIGS. 4(a) and 4(b). The process moves through steps S150 and S152 shown in FIG. 4(a), and steps S180, S184, S188 and S194, shown in FIG. 4(b) as described in the third example discussed above, to determine that there are two professional orders at 2½ along with the PMM's quotation. At step S196 the incoming order is allocated among the PMM 3, PRO #1, and PRO #2. According to one embodiment, the following equation is used to allocate the order among the PMM 3 and the two professionals:

$$X\% = \text{Max}[40\%, Siz[pmm]/(Siz[pmm]+Siz[pro])]. \qquad \text{Equation \#2}$$

Where:

siz[pmm] is the size of offer of the PMM 3 at the market price; and siz[pro] is the size of the combined orders of the two professionals.

If X % would result in a fractional allocation, the number allocated is rounded up to the nearest whole number. Other allocation formulas are possible without departing from the scope of the invention. For example, a minimum percentage greater or smaller than 40% may be used. Further, the pro rata allocation can be modified by, for example, weighting factors that favor PRO #1 or PRO #2. According to Equation 2, the PMM 3 is entitled sell 40% of the 10 contracts against the incoming order, or 4 contracts. The remainder of the order is filled by the professionals, PRO #1 and PRO #2 on a pro rata basis. Although PRO #1 has time priority, PRO #2 has a greater size, so his share is computed first. PRO #2 has 20 out of the 30 contracts of the orders placed by the two professionals at the lowest offer and is entitled to 66% of the 6 remaining contracts, or 4 contracts. The remaining 2 contracts are traded by PRO #1.

TABLE III

| | | BID | | | | |
|---|---|---|---|---|---|---|
| CUS | PRO #1 | PRO #2 | PRO #3 | PMM | TOTAL | PRICE |
| 3 | 20 | 20 | 10 | 10 | 63 | 3 |
| 10 | 20 | | | | 30 | 2½ |

Table III shows yet another example of the bid side of the book stored in the book memory 33, showing that three professionals, PRO #1, PRO #2, and PRO #3, have placed orders to buy along with a public customer order and the PMM 3 quotation at the highest bid price of 3. The three professionals PRO #1, PRO #2 and PRO #3 are listed in order of time priority.

As a fifth example, assume a public customer limit order to sell 49 contracts at 3 is entered. The offer matching process 36 proceeds as shown in FIGS. 5(a) and 5(b). The offer matching process 36 determines at step S200 that there is a public customer order at the highest bid and matches 3 contracts of the incoming order against the CUS order at step S216. The offer matching process moves to step S218 and determines that there remains 46 contracts in the incoming order, then moves to step S202 to determine that the original size of the order is greater than 5 contracts, which is the PMM small order preference size for the purposes of this example. The offer matching process 36 then applies the allocation formula and completes steps S222, S226, S230 and S234 in FIG. 5(b) as explained in previous examples, to determine that there are more than two professionals with orders or quotations along with the PMM 3 quotation at the highest bid price. Step S238 allocates the remaining 46 contracts among the PMM 3 and the three professionals. According to one embodiment, the order is allocated according to the following formula:

$$X\% = \text{Max}[30\%, Siz[pmm]/(Siz[pmm]+Siz[pro])]. \qquad \text{Equation \#3}$$

Where:

siz[pmm] is the size of the bid of the PMM 3 at the market price; and siz[pro] is the size of the combined orders of the three professionals.

If X % would result in a fractional allocation, the number allocated is rounded up to the nearest whole number. Other allocation formulas can be used. For example, a minimum percentage greater or smaller than 30% can be used or weighting factors can be provided to adjust the allocation among the professionals based. According to Equation 3, the PMM 3 is entitled to 14 contracts, however, the PMM's bid is for only 10 contracts at a price 3. Therefore, the PMM 3 trades only 10 contracts at 3 against the incoming order. The balance of 36 contracts are allocated among the three professionals on a pro rata basis. In this case, PRO #1 and PRO #2 have the same size, which is greater than PRO #3. Because PRO #1 has time priority over PRO #2, PRO #1 gets matched first. PRO #1 has 40% of the orders among the professionals (20/50) and is entitled to 15 contracts, leaving 21 contracts. PRO #2 has now has the largest size and 66% of the size at the highest bid (20/30) and is matched for 14 contracts, leaving 7 contracts. PRO #3, the last remaining professional, trades the balance of 7 contracts.

The examples given here are by way of illustration only. No limitation of the invention should be implied.

Tick-Worse Process

The tick-worse process 39 according to the present invention allows the PMM 3 and CMMs 5, 7, to specify a set of quotations that are automatically entered when the size of a quotation in the book memory 33 is reduced to zero. Each quotation placed by the PMM 3 and CMMs 5, 7 is associated with a quotation table for moving quotations one or more trading increments worse than the best price, a worse price being a lower price than a previously entered quotation to buy and a higher price than a previously entered quotation to sell. Table IV is an example of such a quotation table. The quotation table specifies variable volumes at which the PMM 3 and CMMs 5, 7 are willing to trade at successively lower bids or higher offers. Because this process is automatic, continuous quotations are maintained in the book memory 33 without a delay between an execution and the PMM 3 and CMMs 5, 7 manually entering another quotation.

TABLE IV

| Initial Size | 30 contracts |
| --- | --- |
| 1-tick worse | 10 contracts |
| 2-ticks worse | 30 contracts |
| 3-ticks worse | 0 contracts |
| 4-ticks worse | 60 contracts |
| 5-ticks worse | 60 contracts |
| 6-ticks worse | 60 contracts |
| 7-ticks worse | 60 contracts |
| 8-ticks or more worse | 100 contracts |

It is to be understood that the quotation table shown in Table IV is by way of example only. A limitless number of quotation tables may be specified without departing from the scope of the invention. Further, each PMM 3 or CMM 3, 7 can specify a quotation table for each quotation entered.

In this example, the PMM 3 has placed an initial quotation for 30 contracts shown in the first line of Table IV and has specified a range of quotation sizes to be quoted when the initial quotation is exhausted. The table is stored in the system memory 26 and is retrieved by the tick-worse process 39 when needed. The depth of the table and the number of contracts for each tick level can be adjusted by the PMM 3. When the initial quotation for 30 contracts, as shown in the first line of Table IV, is exhausted, the tick-worse process 39 automatically generates a new quotation for 10 contracts at a price one tick worse than the market price. If the initial order for 30 contracts were placed at a market price of 3, then after these contracts are traded, the tick-worse process 29 automatically generates a new quotation for 10 contracts at $2^{15}/_{16}$ (assuming that below 3 the minimum trading increment is $1/_{16}$). When the market at the price one tick worse becomes exhausted, the tick-worse process 39 enters a quotation for 30 contracts at a price two ticks worse than the original quotation and so on.

TABLE V

| | | BID | | |
| --- | --- | --- | --- | --- |
| CUS | PRO | PMM | TOTAL | PRICE |
| 3 | | 30 | 33 | 3 |
| | | | | $2^{15}/_{16}$ |

Table V shows an example of the bid side of the book in which a public customer has entered an order to buy 3 contracts at 3 and the PMM 3 has entered a quotation to buy 30 contracts at 3. The PMM 3 has stored the table shown in Table IV in the system memory 26. Assume that a market order is received offering to sell 40 contracts. The order is passed to the offer matching process 36 as shown in FIGS. 5(a) and 5(b) after completing all necessary steps in FIG. 3(d) to reach S114. After steps S200 and S216 of FIG. 5(a), the incoming public customer order is matched for 3 contracts with the public customer order in the book memory 33 at the highest bid price of 3, leaving 37 contracts of the incoming market order unmatched in step S218. After step S202, the offer matching process 36 applies the allocation formula according to FIG. 5(b) and completes steps S222 and S226, matching the PMM's quotation for 30 contracts at 3 in step S228, and leaving 7 contracts of the incoming market order unmatched.

Figure 6:
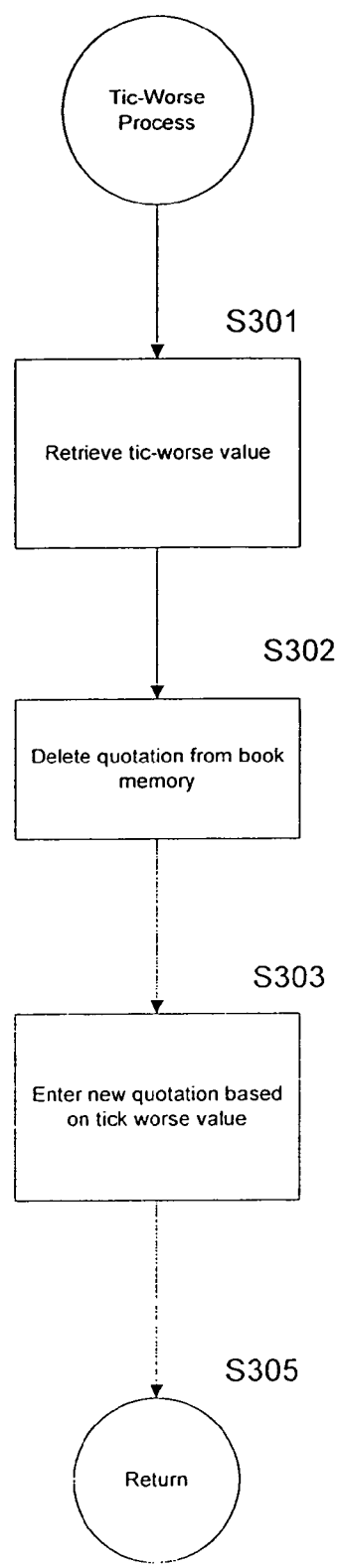

Because the full size of the PMM's quotation at 3 has been exhausted, the tick-worse process 39 is initiated as illustrated in FIG. 6. The tick-worse process 39 automatically retrieves a tick-worse value from the system memory 26 in step S301. The tick-worse value depends on the number of times the PMM 3 has been ticked down after placing the quotation with which the tick-worse table is associated. Here, since this is the first time the PMM 3 has been ticked down, a tick down-value of 10 contracts is retrieved based on the table shown in Table IV. The PMM's quotation at 3 is deleted from the book memory 33 in step S302 and a new quotation for the PMM 3 is automatically entered in the book memory 33 at a price one tick worse than the deleted quotation. Thus, a quotation for 10 contracts at $2^{15}/_{16}$ is placed for the PMM 3 at step S303. At step S305 the process returns to step S212 in FIG. 5(a) and the offer matching process 36 continues at step S200, only now the highest bid is $2^{15}/_{16}$. The process moves through steps S202 and applies the allocation formula according to FIG. 5(b), matching the remaining 7 contracts against the PMM's new quotation at $2^{15}/_{16}$ that was generated by the tick-worse process 39 in step S303 above.

TABLE VI

| | | OFFER | | |
| --- | --- | --- | --- | --- |
| Price | Total | CUS | PRO #1 | PMM |
| 3 ½ | 60 | | 30 | 30 |
| 3 ⅝ | 5 | 5 | | |

Table VI shows an example of the offer side of the book. As a further example, assume that a market order to buy 75 contracts is entered. Assume also that both the PMM 3 and PRO #1, who is a CMM 5, 7 that has entered a quotation, have each entered the same quotation table shown in Table IV along with their initial quotations of 30 contracts.

The bid matching process 34 proceeds through steps S150 and S152 shown in FIG. 4(a), as described in previous examples, and applies the allocation formula according to FIG. 4(b). Both of the quotations from the PMM 3 and PRO #1 are exhausted at 3½, leaving 15 contracts of the market order unmatched. The tick-worse process 39 retrieves the tick-worse values for both the PMM 3 and PRO #1 in step S301 of FIG. 6, and deletes the quotations at 3½ from the book memory 33 in step S302. In step S303, the tick-worse process automatically enters new quotations for the PMM 3 and PRO #1 at the price of 3⅝ for 10 contracts each (assuming that above 3, the minimum trading increment is ⅛). At step S305 the process returns to step S164 in FIG. 4(a) and the offer matching process 36 continues, only now the lowest offer is 3⅝. The process moves to step S168 and matches 5 contracts against the public customer order to sell at 3⅝, and then moves through step S152 to apply the allocation formula, completing steps S180, S184 and S188 to match the remaining 10 contracts in step S196 according to FIG. 4(b).

Step-Up or Tick-Worse Process

Figure 7:
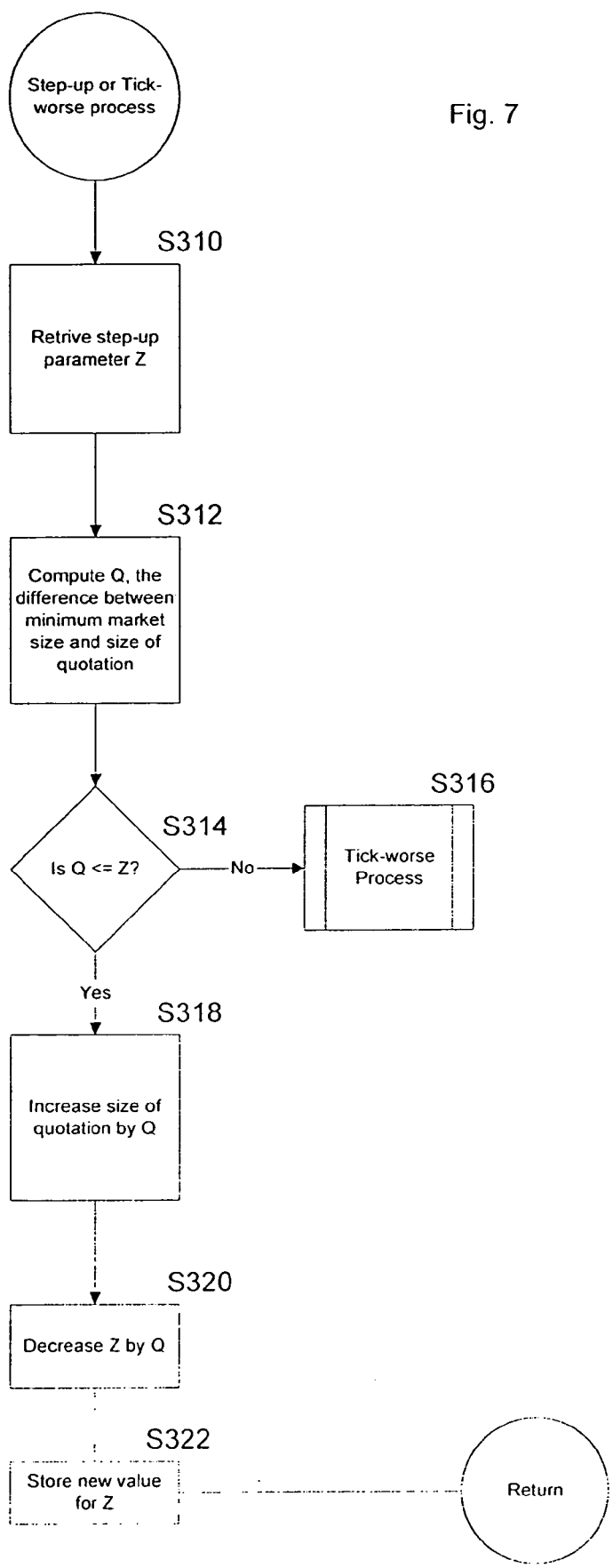

FIG. 7 illustrates the step-up or tick-worse process 38. The step-up or tick-worse process 38 is initiated when there is a PMM 3 or CMM 5, 7 quotation at the best price and the size of the best price in the book memory 33 becomes less than the minimum market size set in the system memory 26. The PMM 3 or CMM 5, 7 sets a parameter Z of a certain number of contracts with respect to each quotation entered. At step S310, the step-up or tick-worse process 38 retrieves the Z parameter, and at step S312, calculates Q, which is the difference between the minimum market size and the size of the quotation at the best price at step S312. At step S314 the step-up or tick-worse process 38 determines whether there is sufficient size in the Z parameter, that is, whether Q is less than or greater than Z. If Q is greater than Z, the step-up or tick-worse process 38 initiates the tick-worse process 39 at step S316. If Q is equal to or less than Z, the size of the quotation is increase by Q at step S318, which results in the size of the quotation becoming equal to the minimum market size. Z is then decreased by Q at step S320, and the new value for Z is stored in the system memory 26 in step S322.

TABLE IX

| | | BID | | |
|---|---|---|---|---|
| CUS | PRO | PMM | TOTAL | PRICE |
| | | 10 | 10 | 3 |
| 10 | 20 | | 30 | 2 ½ |

As another example of the step-up or tick-worse process 38, Table IX shows an example of the bid side of the book. Assume a market order to sell 6 contracts is entered. The exchange 1 trades all 6 contracts in the market order against the PMM's quotation at 3 in the manner discussed with reference to FIGS. 5(a) and (b). A total of 4 contracts at the market price of 3 remain in the PMM's quotation. Assuming a minimum market size of 10 contracts, the step-up or tick-worse process 38 will either step-up the PMM's quotation to 10 contracts or initiate the tick-worse process 39 as described above. At step S312 Q is determined to be 6 (10–4). Step S314 determines whether the PMM 3 will be stepped up or ticked down by comparing Q with the Z. If Z=7 then, since Z is greater than Q, the PMM's quotation is stepped up by 6 contracts at step S318, Z is reduced to 1 in step S320, and the resulting market has a total of 10 contracts at the price of 3. The resulting book is as shown in Table X.

TABLE X

| | | BID | | |
|---|---|---|---|---|
| CUS | PRO | PMM | TOTAL | PRICE |
| | | 10 | 10 | 3 |
| 10 | 20 | | 30 | 2 ½ |

If however, Z=5, then since Z is less than the step-up size of 6, and the PMM 3 will be ticked-down according to the tick-worse process 39 initiated in S316.

Derive or Trade Process

The exchange 1 according to one embodiment of the present invention maintains a minimum size at the best bid and best offer, referred to herein as X. The value of X is variable and may be change in the system memory 26. According to one embodiment of the invention, the minimum market size X is 10 contracts. When an incoming public customer limit order that cannot trade improves the market (that is, when an order to buy at a price higher than the best bid in the book memory 33 or an offer to sell at a price lower than the best offer in the book memory 33) and the size of the order is less than 10 contracts, the order process 25 sends the order to the derive or trade process 32 at step S43(g) of FIG. 3(c) if it is an order to sell and at step S31(g) of FIG. 3(b) if it is an order to buy. If an incoming professional order or quotation improves the best price for less than 10 contracts, it is deleted according to steps S43(f) of FIG. 3(c) and S31(f) of FIG. 3(b).

The derive or trade process 32 will either automatically match an incoming public customer order that improves the market for fewer than 10 contract at the order's stated price, or else derive an order for the PMM 3 at the stated price of the order so that the size at the best price will be 10 contracts. Whether an order is automatically traded or whether an order is derived is determined by a parameter stored in the system memory 26. A variable Y, the number of contracts the PMM 3 is willing to have derived based on how much an order improves the market is entered by the PMM 3. According to one embodiment, Y can be determined using a matrix functionality shown in Table VII.

TABLE VII

If improvement = 1/16 then Y = 9
If improvement = 1/8 then Y = 7
If improvement = 3/16 then Y = 4
If improvement = 1/4 then Y = 2

The functionality of Table VII is based on the assumption that the further away a market improving order is from the PMM's quotation price, the more willing the PMM 3 will be to trade it rather than join it with a derived order. According to one embodiment of the invention, a market-improving order is traded away or joined with a derived order using the following formula.

If ($X$ minus $Siz$[limit orders])>$Y$ then trade against the public customer order;

If ($X$ minus $Siz$[limit orders])<=$Y$ then derive ($X$ minus $Siz$[limit order]) for the PMM 3 at the new market price, where X=minimum market size; and
Siz[limit orders]=total number of limit order contracts at the market improving price.

The PMM's derived order is only good as long as the public customer incoming order that caused it to be created remains active. If the market-improving public customer limit order is canceled or traded in full, the derived order is removed. If the market-improving public customer order is partially traded, the derived order may increase, or the balance of the market-improving customer order may be executed automatically. When new orders are placed on the book at the same price as the PMM's derived order, these new orders reduce the derived order size to minimize the number of derived order contracts necessary to maintain the minimum market size.

TABLE VIII

| BID | | | | | OFFER | |
|---|---|---|---|---|---|---|
| Cust | PRO | PMM | Total | Price | Price | Total |
| 3 | 10 | 30 | 43 | 3 | 3¼ | 30 |
| 10 | | | 10 | 2¼ | 3½ | 20 |

Table VIII shows an example of bids and offers stored in the book memory 33. Assume a public customer limit order to buy 2 contracts at 3⅛ is entered. Step S29 of the bid matching process 34 shown in FIG. 3(*b*) determines that this order cannot trade because there are no offers to sell at less than 3¼. Step S31(*a*) determines that this bid would improve the market if it were entered on the book since the highest bid price is currently 3. Entering the order on the book at 3⅛ would improve the market by raising the market bid price. After determining that the order size is less than the minimum market size (assumed to be 10 contracts) at step S31(*c*) and that the order is a public customer order at step S31(*e*), the derive or trade process 32 is started at step S31(*g*).

Figure 8:
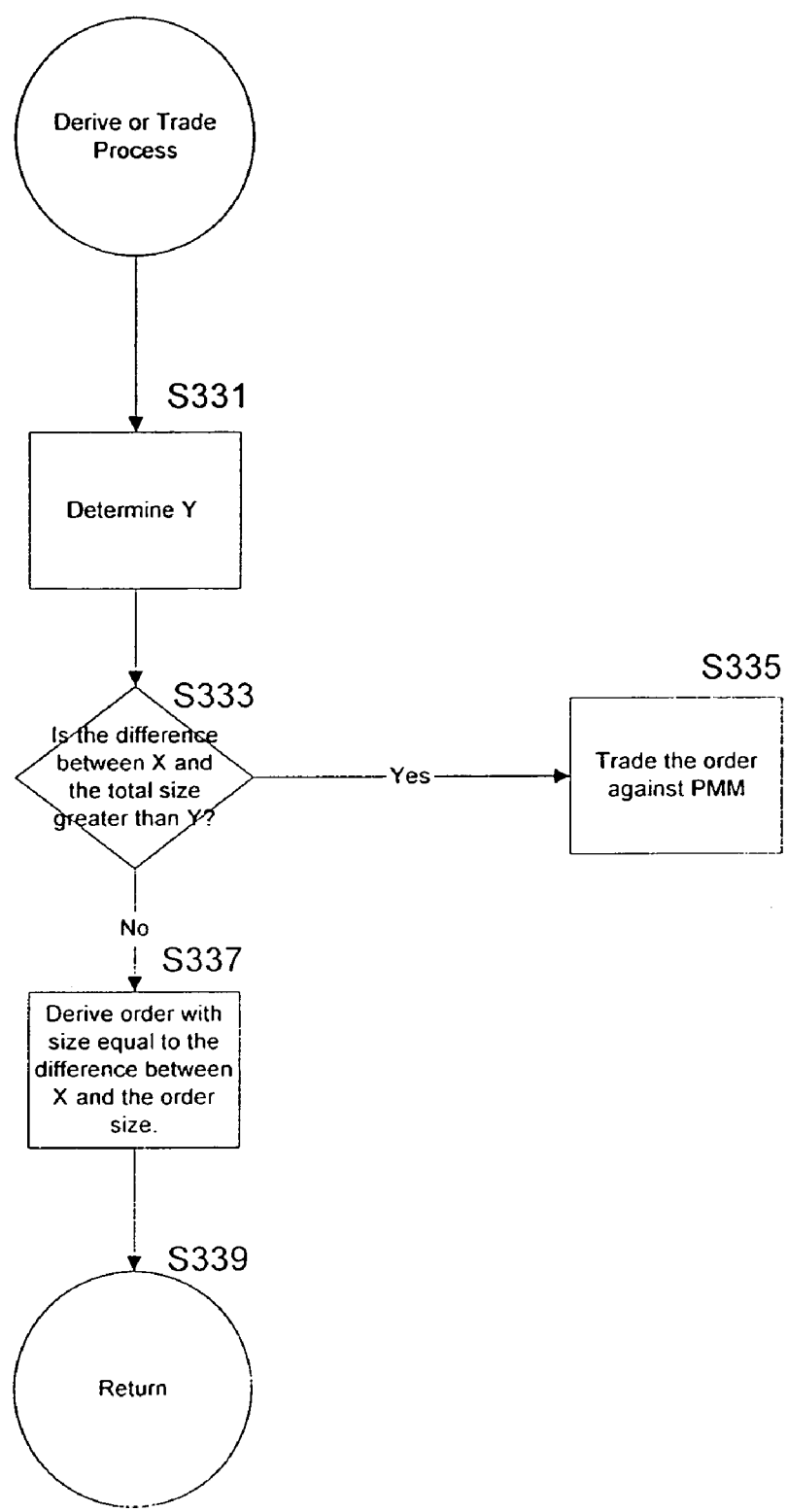

The operation of the derive or trade process 32 is shown in FIG. 8. Step S331 determines the maximum derived order size, Y, allowed by the PMM 3 from the matrix provided by the PMM 3 stored in the system memory 26. Since this bid improves the market by ⅛, from 3 to 3⅛, the value of Y from Table VII is 7. Step S333 determines that the difference between the minimum market size, 10, and the incoming order 2 is, 10−2=8, which is greater than Y=7. Step S335 automatically trades the incoming order against the PMM 3 at 3⅛. The best bid price remains 3.

As a further example, assume the same book as in Table VIII. A public customer order for 4 contracts at 3⅛ is entered. Now the derive or trade process 32 at step S333 in FIG. 8 determines that the difference between the minimum market, 10, and the order size 4 is, 10−4=6, which is less than Y=7. Step S337 derives an order for the PMM 3 at 3⅛ for 6 contracts to provide a minimum market of 10 contracts at the new price of 3⅛. The public customer order at 3⅛ will always trade before the derived order. If the customer order for 4 contracts is executed in full, the derived order at 3⅛ will be deleted, and the book memory 33 will return to its state in Table VIII. If the public customer order is reduced by an execution, for example, to 2 contracts, the derive or trade process 32 will return to step S333 and determine that the difference between the minimum market, 10 and the remaining order size 2 is, 10−2=8, which is greater than Y=7. The remaining portion of the order will be executed automatically against the PMM 3 at step S335.

The determination of the maximum derived order size, Y, can be made using means other than the functionality shown in Table VII. According to one embodiment of the invention, Y depends on the absolute market price as well as on the price improvement of the incoming order.

The derive or trade process 32 will also be initiated if the best price become less than 10 contracts. For example, again assume the market illustrated in Table VIII, if the PRO order is cancelled and the PMM 3 moves its quotation to 2¼, the bid at 3 would be reduced to only the public customer order for 3 contracts. The derive or trade process 32 would be initiated by the order process, and an order would be derived for 7 contracts in step S333 as described in the previous example. Moreover, if a professional order for fewer than 10 contracts became the best bid in a similar manner to this example, the order would be automatically deleted. The step-up or tick-worse process 38 would be initiated if a quotation for fewer than 10 contracts were to be the become the best bid, as described above.

Match of an Away Market Price

According to an embodiment of the invention, prior to executing an incoming public customer order at the best price in the book memory 33, the order process 25 compares the best price in the book memory to prices quoted for the same option on the away market 17. If the price on the exchange 1 is as good as or better than the price on the away market 17, the trade is executed. If the price on the away market 17 is better than the best price on the exchange 1, the away market process 28 is initiated.

Figure 9:
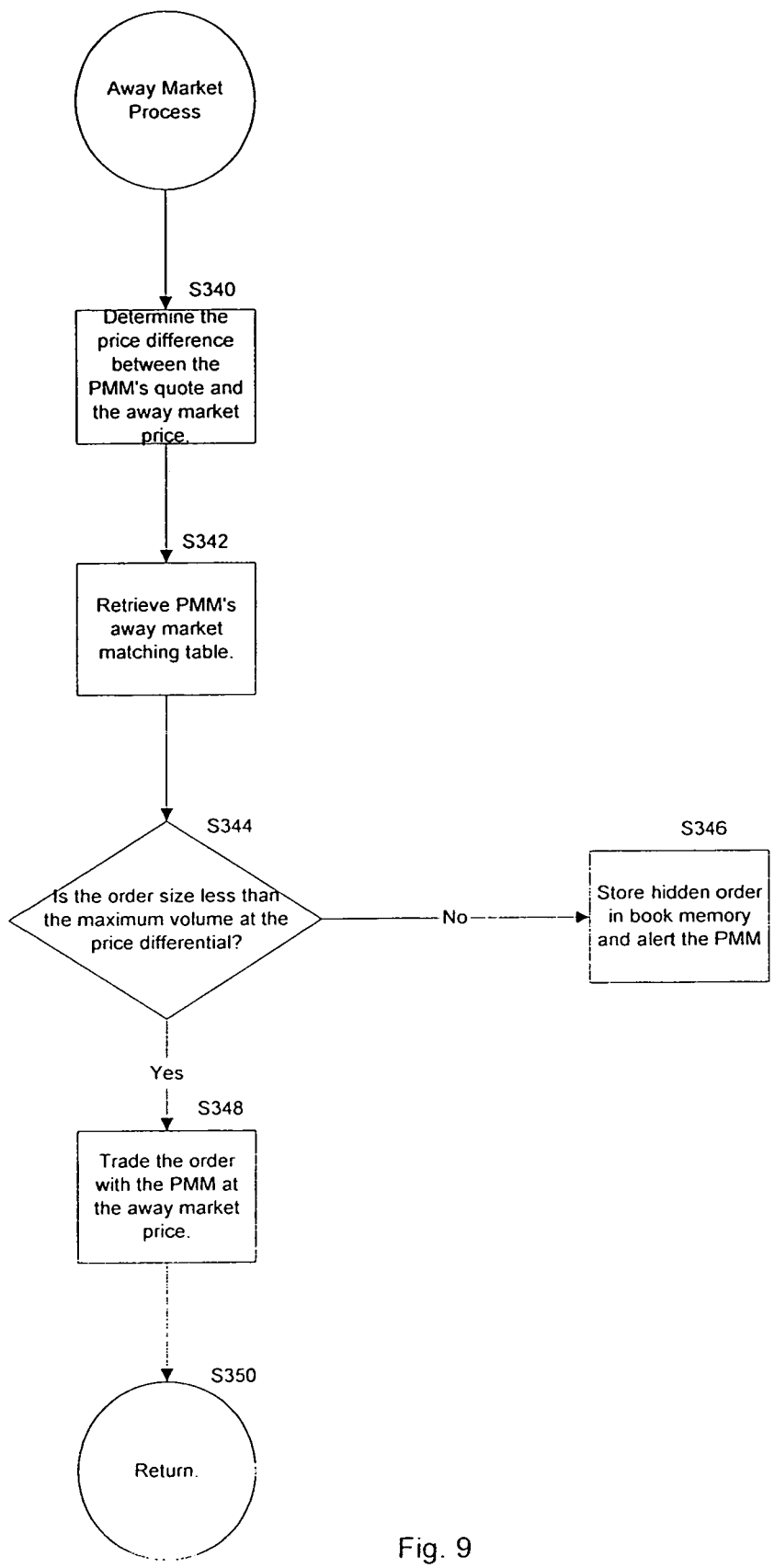
Figure 10A:
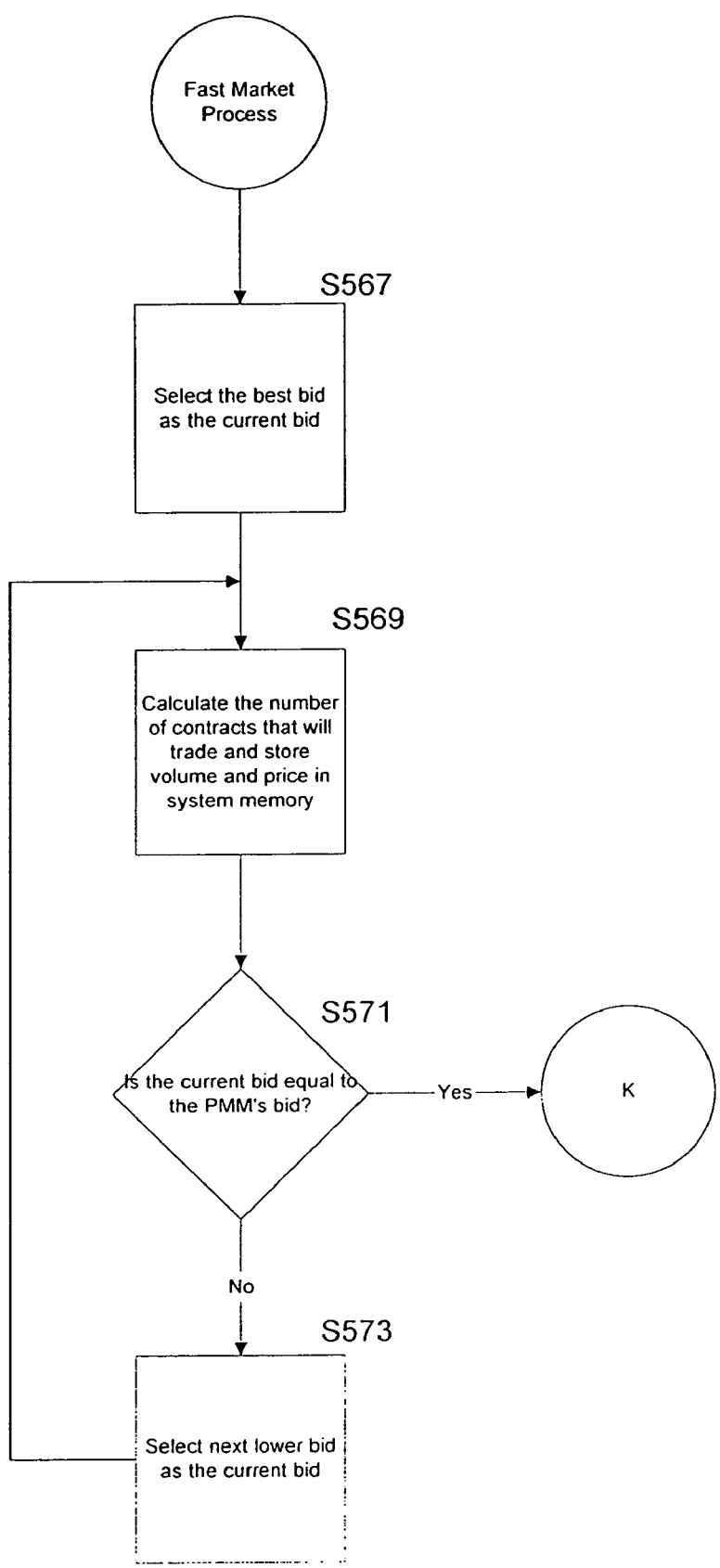
Figure 10B:
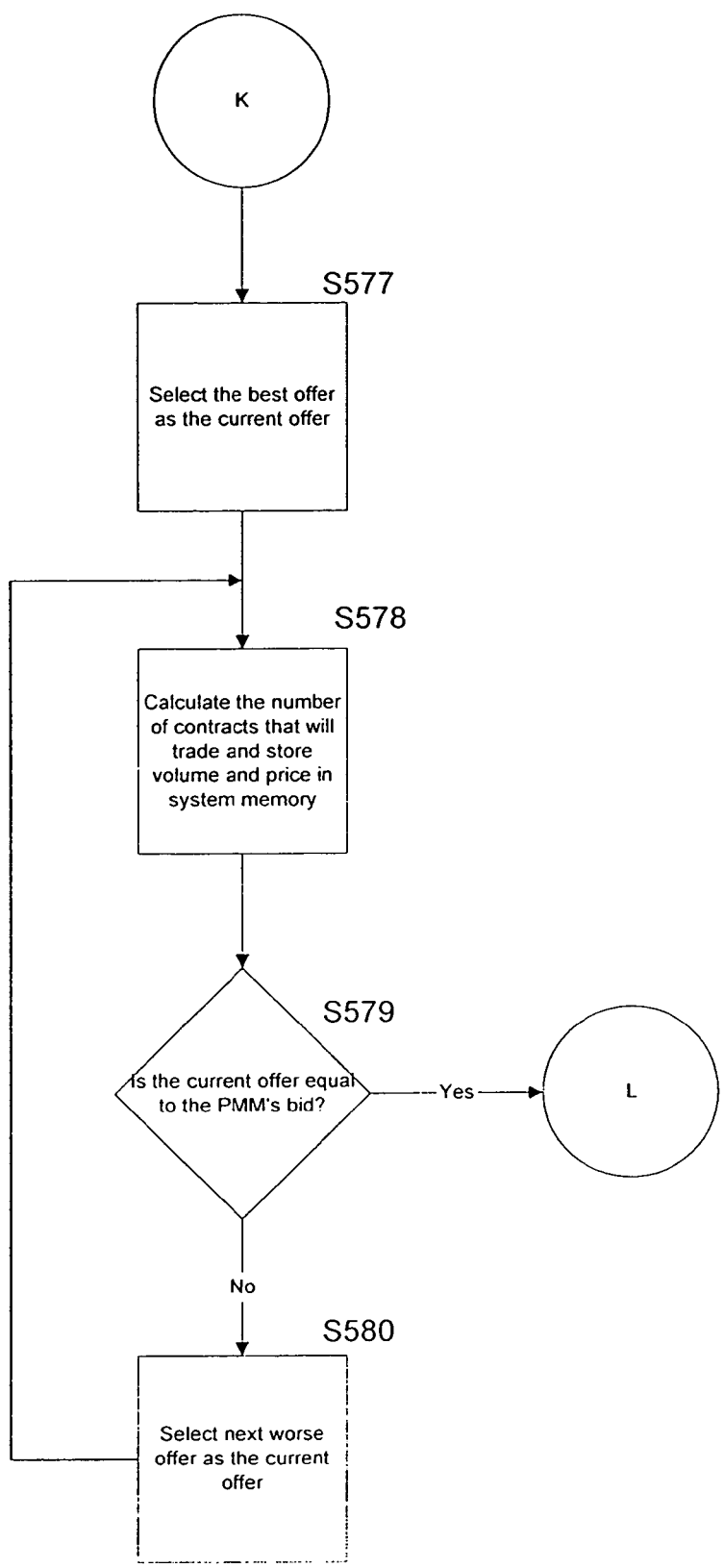
Figure 10C:
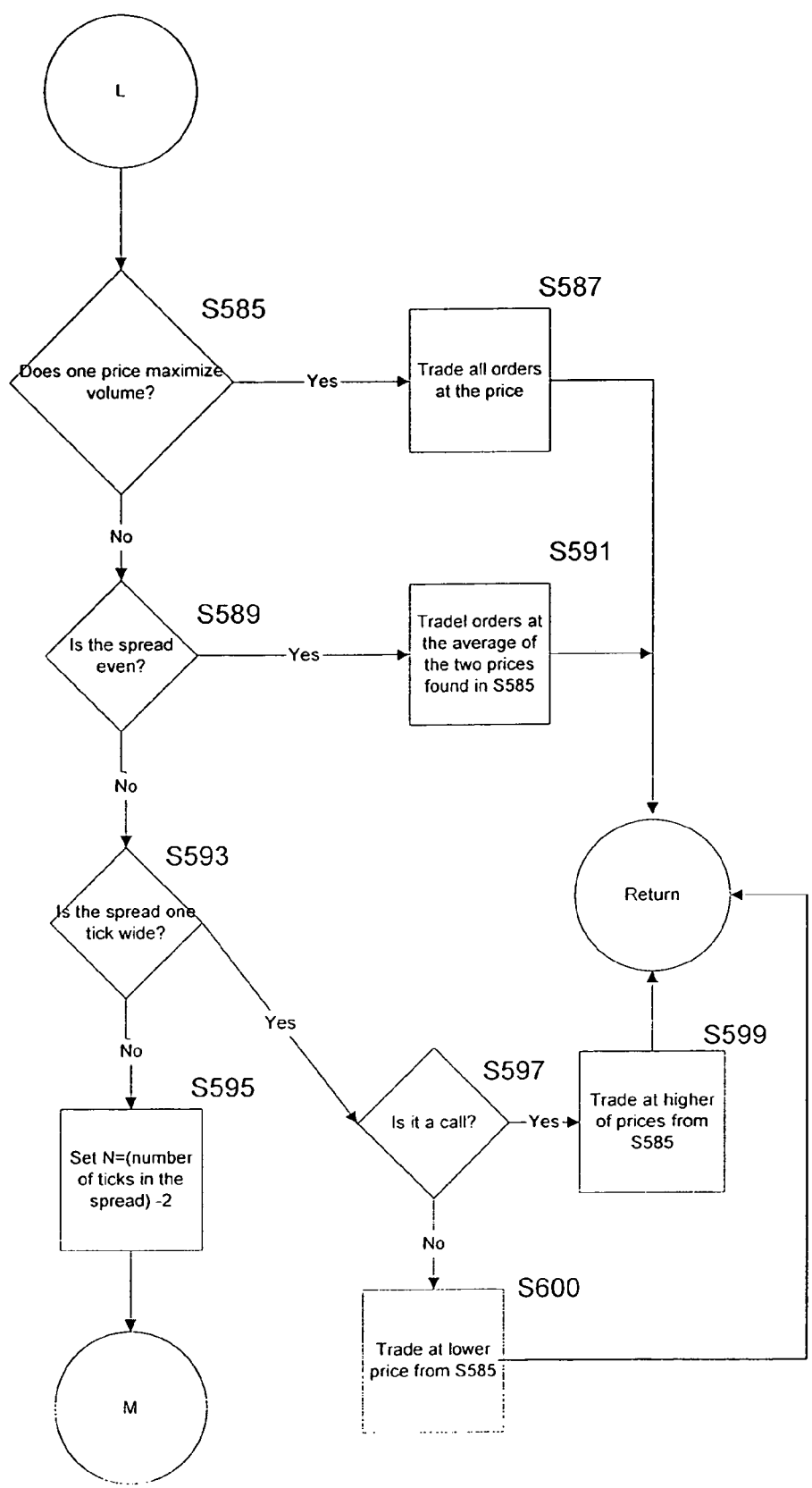
Figure 10D:
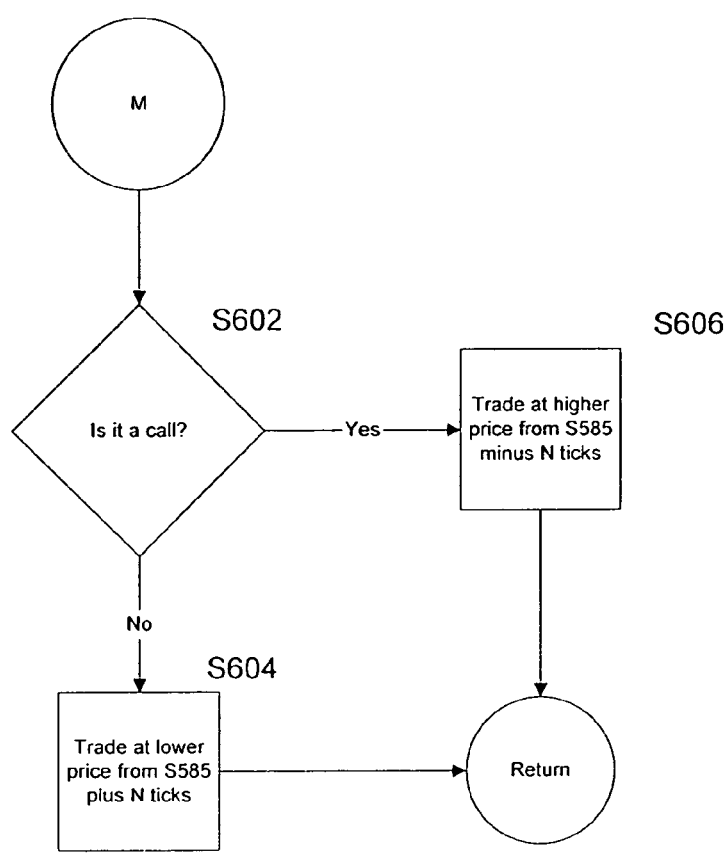

The operation of the away market process 28 is illustrated in FIG. 9. The away market process 28 first determines the price difference between the PMM's quotation in the book memory 33 and the away market price at step S340. According to one embodiment of the invention, the away market process 28 receives price information from the reporting entity 19. Step S342 retrieves the PMM's away market matching table from the system memory 26. Table XI shows an example of such a table.

TABLE XI

| If away market is better by | PMM matches up to ?? contracts |
|---|---|
| <= .0625 | 15 |
| <= .1250 | 10 |
| <= .1875 | 5 |
| <= .2500 | 2 |
| <= .3125 | 1 |
| <= .3750 | 1 |
| <= .4375 | 0 |

The away market matching table determines a matching size that is the number of contracts that the PMM 3 is willing to execute at the better price equal to the away market for a range of price differentials between the PMM's quotation and the away market 17. According to one embodiment of the invention, the away market matching table is arranged so that the PMM 3 is more likely to change his price to execute a public customer order at the better away market price where the price differential between the PMM's quotation and the away market 17 is small. Where a large price differential exists, the PMM 3 will only trade small orders or will decline to match automatically. At step S344 the volume of the incoming order is compared with the maximum volume for the price differential given in the away market matching table. If the volume of the order is less than the volume of the order shown in the away market matching table, then step S348 automatically trades the order against the PMM 3 at the away market price. If the volume of the incoming order is greater than the volume given by the away market matching table, then step S346 alerts the PMM 3 of the price differential between the exchange 1 and the away market 17. The PMM 3 can then decide whether to trade the incoming order at the away market price.

If an order is not traded automatically by the PMM 3 in step S348, the order is stored in the book memory 33, but is not displayed as the best price. Rather, the order is hidden, but remains available for execution. For example, if the best bid in the book memory 33 is 4 and the best offer is 4¼, and the best bid from another market is 4⅛, a public customer order to sell at 4 that is stored at step S346 may be executed against an incoming market order or limit order to buy at 4¼ or higher. In this example, both the public customer order to sell at 4 and the order to buy received a better price.

Fast Market Process

When the market for an options contract becomes highly volatile or when the rate at which orders are received becomes too great, it is possible that the best price in the book memory 33 will not accurately reflect the true price of the market. In such situations a fast market can be initiated by the entity administering the exchange 1 by setting a fast market parameter in the system memory 26. The exchange 1 also may monitor information received from the reporting entity 19 and automatically initiate a fast market condition is such a condition is indicated for the security underlying an option.

As shown in FIG. 3(*a*), the order process 25 checks whether a fast market condition exists at steps S9, S17 and S23 by checking the value of the fast market parameter stored in the system memory 26. If a fast market condition exists, the incoming order is rejected at step S11 if it is a block order or a facilitation order, and at step S19 if it is a FARMM order, otherwise the order is sent to the fast market process 37. The fast market process 37 accumulates orders for a time period determined by the value of the fast market parameter. At the end of this time period, a trade is executed at a price calculated to clear a maximum number of orders at a single price. After the trade, incoming orders are once again accumulated for the time period and again trade at the end of the time period. This process provides an equitable price for market orders by preventing orders received within a short period of time from being traded at varying prices. The delay introduced by the fast market process also serves to dampen price fluctuations. Table XII shows an example of a range of delay time periods that can be set depending on the degree of volatility in the fast market according to one embodiment of the invention. Depending on the level of price volatility and/or trading volume, the fast market level can be adjusted to provide the desired degree of damping.

TABLE XII

Fast Market Delay Times

| Fast Market Level | Delay |
| --- | --- |
| 0 | Normal Market - no delay |
| 1 | 20 seconds |
| 2 | 30 seconds |
| 3 | 40 seconds |
| 4 | 50 seconds |
| 5 | 60 seconds |
| 6 | ISE staff enters the number of seconds at the time the fast market is called |

The operation of the fast market process 37 is illustrated in FIGS. 10(*a*) through 10(*d*). Step S567 shown in FIG. 10(*a*) selects the best (highest) bid in the book memory 33 as the current bid. Step S569 calculates the number of contracts that would trade at the current bid. Step S571 determines whether the current bid is equal to the PMM's bid. If not, step S573 selects the next lower bid and begins step S569 again. If the PMM's bid has been reached, step S571 moves the process to step S577 in FIG. 10(*b*), which selects the best (lowest) offer in the book memory 33 as the current offer. Step S578 calculates the number of contracts that would trade at the current offer. Step S579 determines whether the current offer is equal to the PMM's offer. If not, step S580 selects the next higher bid and begins step S578 again. If the PMM's offer has been reached, step S579 moves the process to step S585 in FIG. 10(*c*).

If there only one price that maximizes the number of contracts that can be traded, step S585 trades orders at that price. If both the current bid and current offer prices will lead to the same maximum number of contracts traded, then step S589 determines whether the spread between the current bid and offer prices is an even number of ticks. If it is, orders are traded at the average of the current bid and current offer prices at step S591. If the spread is not even in step S589, the process stores a variable N, which equals the number of ticks (i.e., trading increments) in the spread minus two, and moves to step S595. If the spread is one tick wide in step S593, the process determines whether the instrument is a put option or a call option. If it is a put option, step S600 trades the orders at the lower of the prices determined in S585. If it is a call option, step S599 trades the orders at the higher of the prices determined in Step S585. Where the process moves to step S602 in FIG. 10(*d*), it determines whether it is a call option or a put option. If it is a put option, orders are traded at the lower of the prices determine in S585 plus N ticks in step S604, and if it is a call option, orders are traded at the higher price determined in S585, minus N ticks in step S606.

Opening Process

The opening process 40 is initiated by the PMM 3 to trade orders and quotations accumulated when the exchange 1 is not executing trades, e.g., overnight. The opening process 40 employs the same process as the fast market process 37 described above and illustrated in FIGS. 10(*a*) through 10(*d*) with one modification. Prior to moving to steps S587 or S589 of FIG. 10(*c*), the opening process 40 determines whether there would be any market or marketable limit order left unexecuted at the maximum price or prices. If there would not be, the opening process 40 moves to steps S587 or S589, if the there would be unexecuted market orders, the opening process moves back to step S567.

Figure 12:
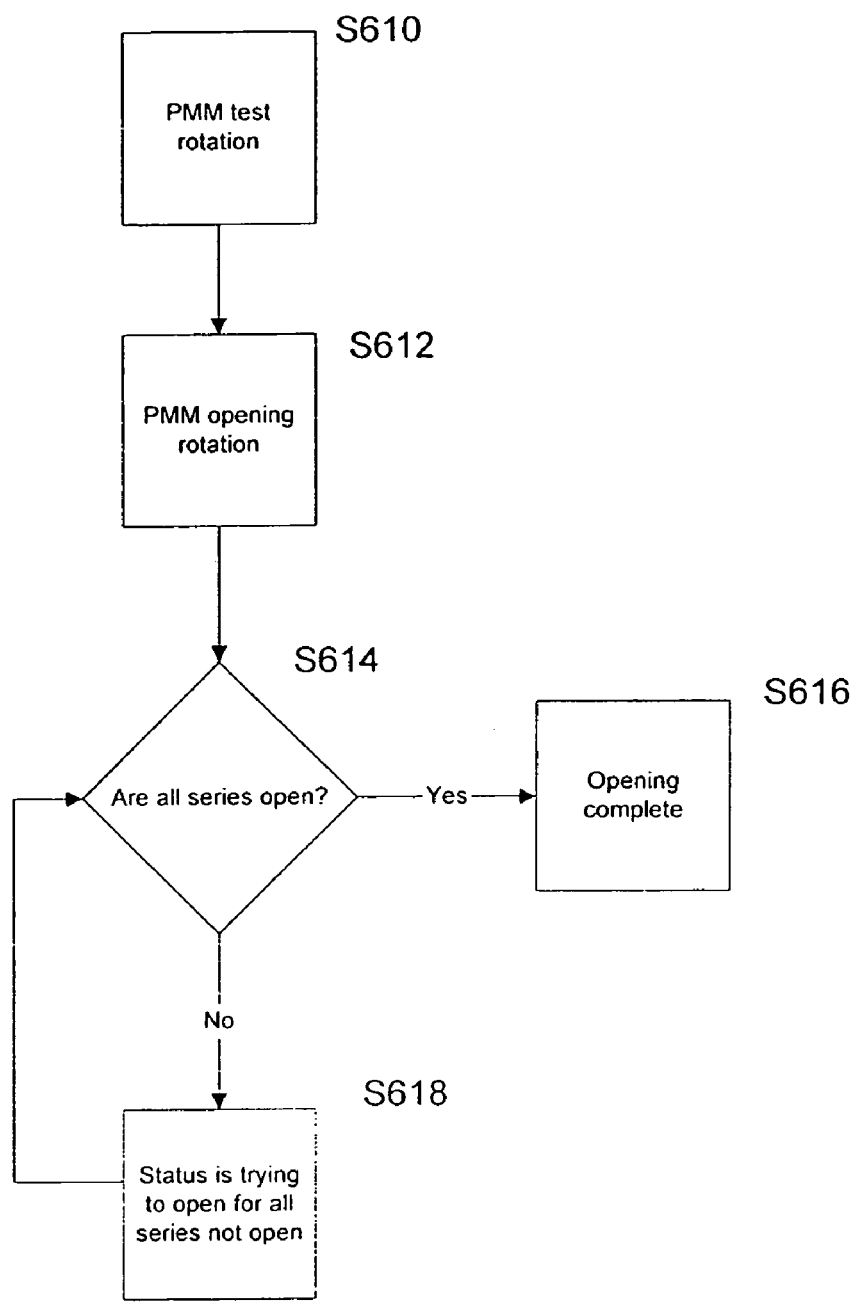

FIG. 12 illustrates how a PMM 3 initiates the opening process. In step S610, the PMM sends a message to the exchange 1 requesting that the opening process 40 test whether the opening process 40 would result in a single price where all market orders are executed as described above. The PMM 3 then instructs the exchange 1 to initiate the opening process 40. If all of the series of an options class are able to complete the opening process 40, the opening of the options class is complete. Any options series that could not complete the opening process 40 continues to attempt to complete the process as described with reference to FIGS. 10(*a*) through 10(*d*).

Block Order and Facilitation Process

Figure 11A:
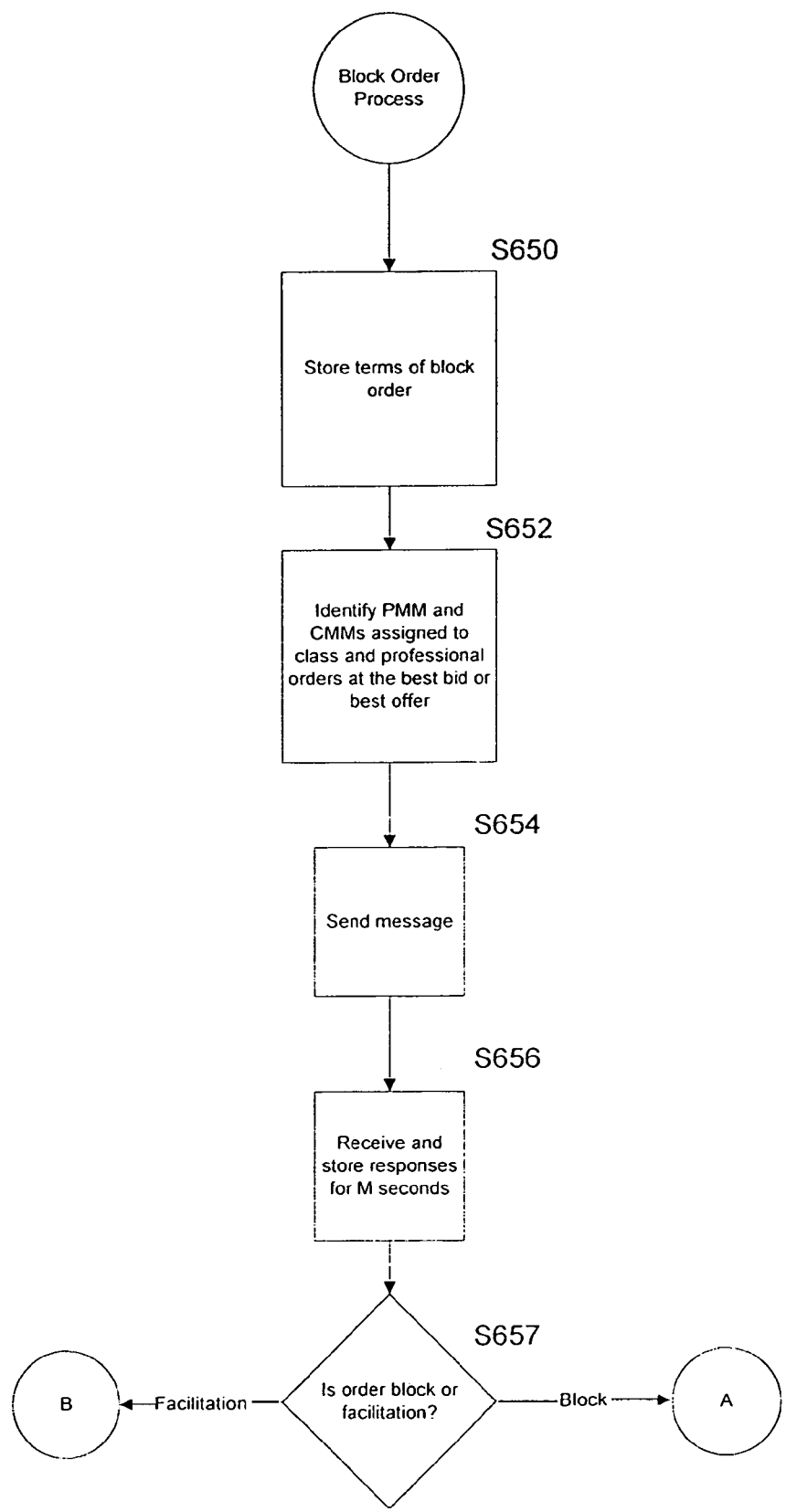
Figure 11B:
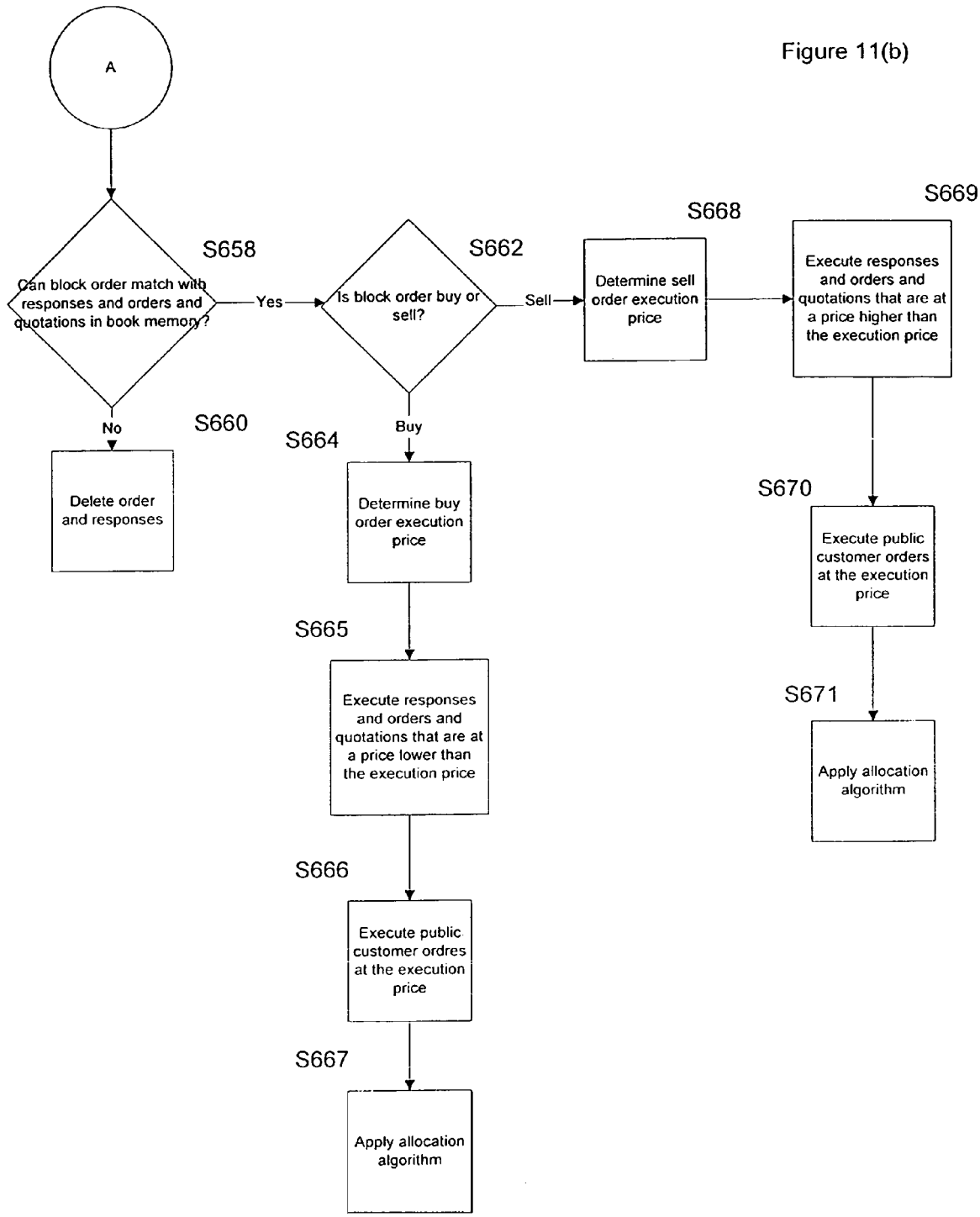
Figure 11C:
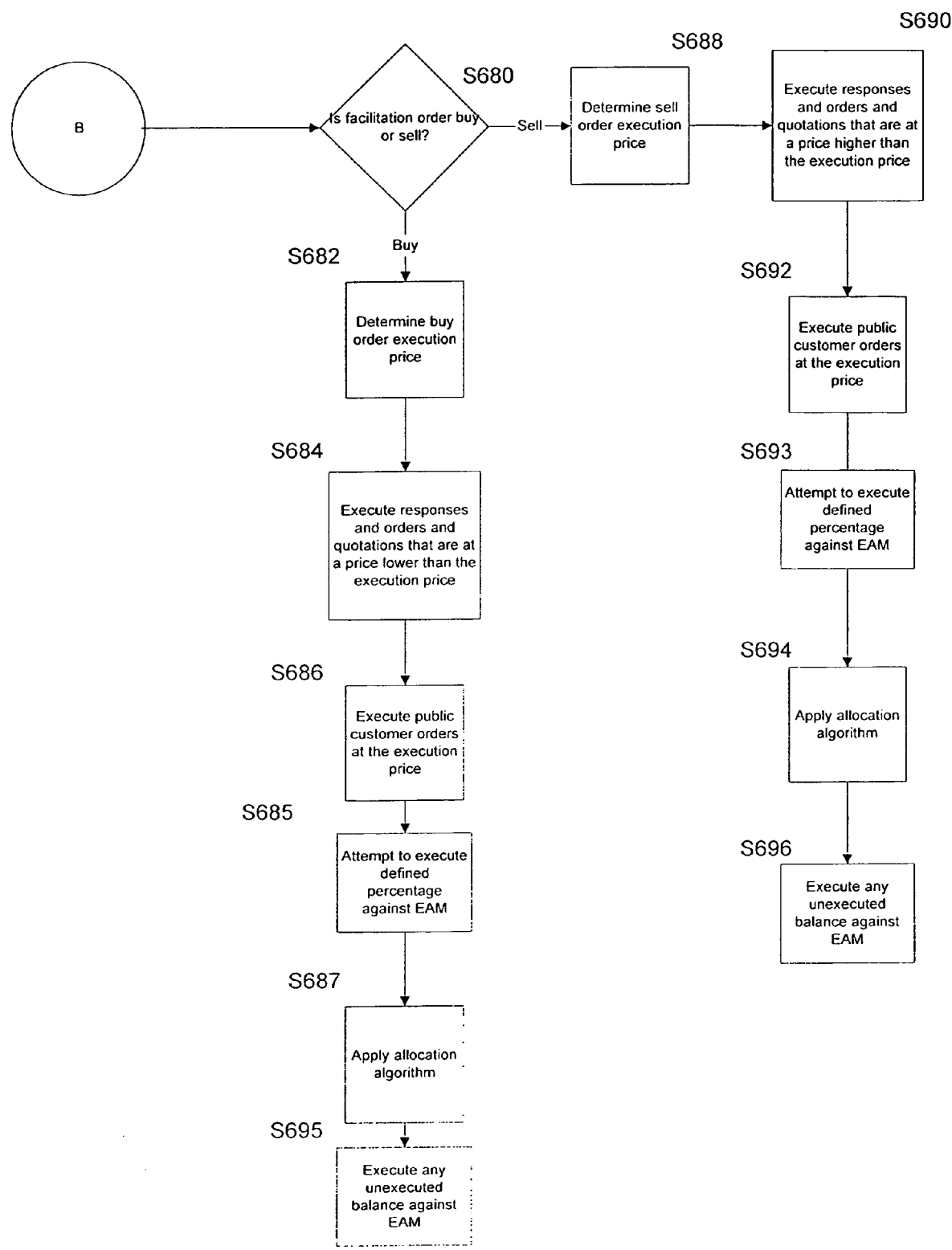

The block order and facilitation process 35 is initiated in step S13 of FIG. 3(*a*). FIGS. 11(*a*) through 11(*c*) illustrate the block order and facilitation process 35 when an order is received in step S650. The block order and facilitation process 35 identifies in step S652 the PMM and CMMs assigned to the option from information stored in the system memory 26 and those participants with professional orders at the best bid or best offer for the option. The block order and facilitation process 35 then sends a message in step S654 to those participants identified in step S652 informing them that a block order or facilitation order has been received. In the case of a block order, the message only includes the information about the order that EAM 9, 11 that entered the order determined should be disclosed. For example, the EAM 9, 11 could determine that the message should not contain information regarding the size of the order or the price of the order or both.

The participants that receive the message in step S654 are given M seconds in which they can choose to respond to the message with bids and offers in step S656. M is a preprogrammed parameter stored in the system memory 26 that may be varied as determined by the entity administering the exchange 1. At the end of M seconds, the block order and facilitation process 35 determines in step S657 whether the order is a block order or a facilitation order.

If the order is a block order, step S658 of FIG. 11(*b*) determines whether a trade can take place, that is whether a block order to sell can be matched with responses to buy and/or buy orders and quotations in the book memory 33, and whether a block order to buy can be matched with responses to sell and/or sell orders and quotations in the book memory 33. If the block order can trade, step S662 sends buy orders to step S664 and sell orders to step S668, where the execution price of the block order is determined. If the order is a facilitation order, step S680 determines whether the order is a buy order or a sell order, and sends buy orders to step S682 and sell orders to step S688, where the execution price of the facilitation order is determined.

The execution price of a block order or facilitation order determined in steps S664 and S682 will be the price of the order unless the entire size of the order can be executed at a lower price. The execution price of a block order or facilitation order determined in steps S668 and S688 will be the order price unless the entire size of the order can be executed at a higher price. If there are participants that are willing to sell at a price that is lower than the execution price of a block order or facilitation order to buy, such participants are executed at the execution price in steps S665 and S684, and if there are participants willing to buy at prices higher than the execution price of a block order or facilitation order to sell, such participants are executed at the execution price in steps S669 and S690. Public customer orders at the execution price are executed in steps S666, S670, S686 and S692.

The allocation algorithm described in FIG. 4(*b*) is applied at steps S667 and S687 and the allocation algorithm described in FIG. 5(*b*) is applied in steps S671 and S694. For the purposes of the allocation algorithm illustrated in FIGS. 4(*b*) and 5(*b*), responses received in step S656 are treated the same as professional orders and quotations.

TABLE XIII

OFFER IN BOOK MEMORY

| Price | Total | CUS | PRO #1 | PRO #2 | PMM |
|---|---|---|---|---|---|
| 2 ½ | 60 | 10 | 10 | 20 | 20 |
| 2 ¾ | 10 |  | 10 |  | 10 |

Table XIII shows an example of the book memory 33. As an example of the block order and facilitation process 35, a block order is entered by an EAM 9, 11 to buy 500 contracts at 2½. The EAM 9, 11 indicates when entering the order that the size of the order should not be revealed, only that the block order is to buy at 2½. After completing steps S3, S7 and S9 of FIG. 3(*a*), the block order is sent to the block order and facilitation process 35 where the terms of the order are stored in S650 and a message is sent to the PMM 3, PRO #1, PRO #2 and any CMMs associated with the options class in the system memory 26. PMM 3 responds that it is willing to sell 250 contracts at 2½ and PRO #1 responds that it is willing to sell 210 contracts at 2½. No other responses within 30 seconds are received, which is the assumed value of M for the purposes of this example.

The block order and facilitation order process 35 determines that the order is a block order in step S657, and in step S658 that the block order to buy at 2½ can match against responses to sell at 2½ as well as orders and quotations in the book memory 33.

TABLE XIV

| Number of Contracts to sell at 2 ½ | Source |
|---|---|
| 10 CUST | Order in book memory |
| 270 PMM | Quotation in book memory (20) |
|  | Response to message (250) |
| 220 PRO #1 | Order in book memory (10) |
|  | Response to message (210) |
| 20 PRO #2 | Order in book memory |

Table XIV shows that there is a total of 520 contracts available to match against the block order to buy. In step S662, it is determined that the order is to buy. In step S664, the price of the transaction is determined. In this example, the block order was to buy 500 at 2½. Since there are more than 500 contracts to match at 2½ and no responses or orders and quotations in the book memory 33 at a price lower than the block order price, the execution price is determined to be 2½ and there is nothing to execute at step S665. The public customer order for 10 contracts is executed at step S666, and the block order and facilitation process 35 applies the allocation algorithm in step S667 according to the same process illustrated at FIG. 4(*b*).

TABLE XV

| Price | Number of contract of buy | Source |
|---|---|---|
| 4 | 10 | Order in book memory |
| 3 ⅞ | 70 | Quotation in book memory (20) |
|  |  | Response to message (50) |
| 3 ¾ | 20 | Cust Order in book memory (10) |
|  |  | Response to message (10) |

As an example of how the execution price is determined, assume that a block order to sell 75, at 3¾ is entered. After completing steps S650 through S657, Table XV represents the responses and order and quotations to buy. The block order and facilitation process 35 determines that the block order can match in step S658 and moves through step S662. The execution price is determined in step S668 as the highest price at which the entire order can be matched, which in this example is 3⅞. The order in the book memory to buy at 4 will be executed at 3⅞ first at step S669. There are no public customer orders at 3⅞, so the process moves through step S670 to apply in step S671 the allocation algorithm described above and illustrated in FIG. 5(*b*).

As illustrated in FIG. 11(*c*), the process for execution of facilitation orders trades a defined certain percentage of the original size of the facilitation against to the EAM 9, 11 in steps S685 and S693 that entered the facilitation order prior to applying the allocation algorithms illustrated in FIGS. 4(*b*) and 5(*b*) in steps S687 and S696 respectively. Further, after completing steps S687 and S696, any remaining unexecuted portion of the facilitation order is traded against the EAM 9, 11 that entered the facilitation order. The percentage of the facilitation order automatically executed against the EAM 9, 11 that entered the facilitation is a value that is stored in the system memory 26.

Quotation Matching Process

Figure 13:
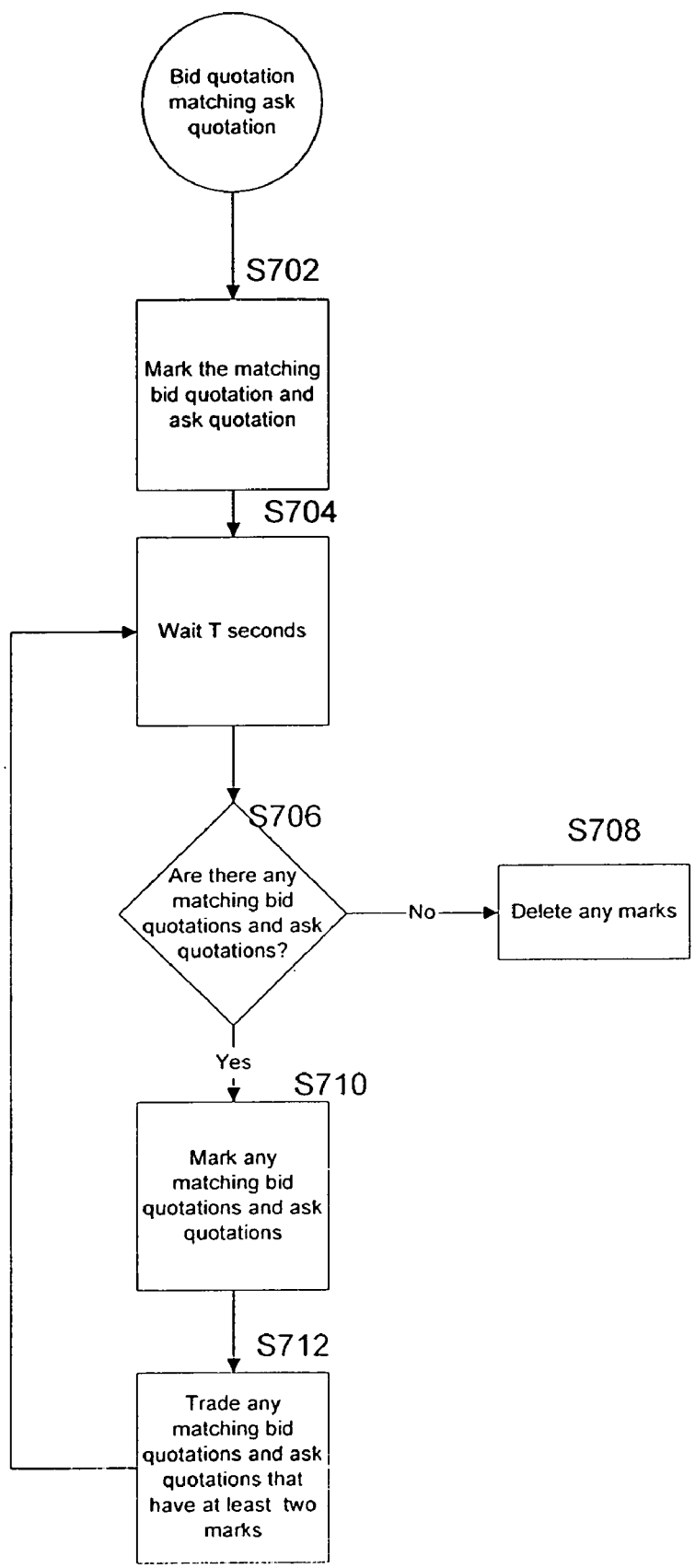

FIG. 13 illustrates the quotation matching process 31, which introduces a delay before automatically matching a bid and an ask quotation. The idea is to prevent quotations from matching only because one participant's automatic quotation system updates its quotation slightly more quickly than another participant's automatic quotation system. As an example, if there is a quotation in the book memory 33 to buy at 4 and a CMM 7, 5 enters a quotation to sell at 4, the quotation matching process marks the quotation to buy and the quotation to sell in step S702 and then waits T seconds in step S704, T being a variable stored in the system memory 26. In step S706, the process determines whether there exists a bid and an offer that match, since during T quotations may have changes. If there are no matching bids and offers, the marks from step S702 are removed in step S708. If there are bids and offers that match, the process marks those quotations in step S710 and executes the matching quotations that have two or more marks at step S712. The process then returns to step S704 to again wait T seconds.

The above embodiments are illustrative of the present invention. It is to be understood that the invention is not intended to be limited by this disclosure, but rather is intended to cover various modifications and equivalent arrangements included within the spirit and scope of the invention, as will be apparent to a person of ordinary skill in the art.

I claim:

1. An automated exchange for operating a market to buy or sell a quantity of a financial instrument within the market, the automated exchange comprising:

a computer interface adapted to receive from a first market participant a block order and a selected subset of information about the block order to be transmitted to second market participants; to transmit the selected subset of information about the block order to the second market participants; and to receive responses to the transmitted information from the second market participants, wherein the order includes an offer to sell or a bid to purchase a predetermined quantity of the instrument at an order price and wherein the selected subset of information excludes at least one of the side, predetermined quantity and order price; and a computer processor coupled with the interface to control the interface to transmit the selected subset of information about the order to the second market participants; and to control the interface to receive a plurality of responses from the second market participants within a predetermined time period, the time period being determined prior to, or at the time of, receiving the order, wherein the processor is programmed with an algorithm for determining if the responses received during the time period are sufficient so that a trade can take place; for allocating the order among the plurality of the responses received during the time period; for determining a price at which to execute the trade; and for executing the trade for the instrument between the order and the plurality of the responses following the time period.

2. The automated exchange according to claim 1, wherein the second market participants include a market maker, wherein the interface is adapted to receive a quotation from the market maker, the quotation including a bid to purchase or an offer to sell a quantity of the instrument at a quotation price; and wherein the processor is further programmed to execute the trade between a portion of the order and the quotation.

3. An automated network for trading a financial instrument, wherein a market participant submits a block order to buy or sell a quantity of the financial instrument within the automated network, the automated network comprising:

a plurality of terminals adapted to transmit and receive trading information;

an exchange computer coupled to the terminals by a communications system;

an interface for receiving the order from a first one of the terminals, the order including an offer to sell or a bid to purchase a predetermined quantity of the instrument, and a selected subset of the information about the order to transmit to one or more second terminals; for transmitting the subset of information about the order to the one or more second terminals via the communication system; and for receiving a plurality of responses to the transmitted information from the second terminals, wherein the selected subset of information excludes at least one of the side, predetermined quantity, and order price;

a timer for determining when a predetermined time period has elapsed after the order is received, the time period being determined prior to, or at the time of, receiving the order; and a memory for accumulating the responses received during the elapsed time period, wherein the exchange computer includes an algorithm for determining if the accumulated responses are sufficient to trade with the order and for allocating the order among the plurality of the received responses accumulated in the memory.

4. The network according to claim 3, wherein the interface receives one or more additional orders and quotations from the second terminals, the network further comprising:

a book memory adapted to store the additional orders and quotations, wherein the exchange computer is further programmed to allocate the block order among the plurality of accumulated responses and the additional orders and quotations stored in the book memory.

5. An automated trading system for operating a market to buy or sell a quantity of a financial instrument comprising:

an automated interface for receiving an order and a matching commitment from a first market participant, the order being an offer to sell or a bid to purchase a quantity of the instrument and the matching commitment being an assurance that the first market participant will trade against a portion of the order; and for receiving subsequently submitted responses of one or more second market participants in response to the order during a predetermined time period following receipt of the order and the matching commitment, the predetermined time period having been determined prior to, or at the time of, receiving the order and the matching commitment;

memory coupled to the interface for storing the order, the matching commitment, and the responses; and a processor, in communication with the memory, programmed to execute an algorithm for allocating the quantity in the order, at the conclusion of the time period, first to one or more of the matching commitment and responses that are at a best price; and then any remaining quantity to one or more of the matching commitment and any responses stored in the memory that are not at the best price.

6. The system of claim 5, wherein the first market participant submitting the matching commitment receives at least a minimum portion of the quantity in the order if at least one of the matching commitment and a stored response submitted by the first market participant submitting the matching commitment is at the best price.

7. The system of claim 6, wherein the minimum portion is a percentage of the quantity in the order.

8. The system of claim 6, wherein the minimum portion is the quantity in the order.

9. The system of claim 5, wherein the memory includes a book memory adapted to store additional orders and quotations from the first or second market participants submitted without a matching commitment and wherein the processor is further programmed to allocate the quantity in the order submitted with the matching commitment, at the conclusion of the time period, first to one or more of the matching commitment, any responses stored in the memory, and any additional orders or quotations stored in the book memory at the best price; and then any remaining quantity to one or more of the matching commitment, any responses stored in the memory, and any additional orders or quotations stored in the book memory that are not at the best price.

* * * * *